US007358516B2

(12) United States Patent
Holler et al.

(10) Patent No.: US 7,358,516 B2
(45) Date of Patent: Apr. 15, 2008

(54) SYSTEM AND METHOD FOR DETERMINING A POSITION OR/AND ORIENTATION OF TWO OBJECTS RELATIVE TO EACH OTHER AS WELL AS BEAM GUIDING ARRANGEMENT, INTERFEROMETER ARRANGEMENT AND DEVICE FOR CHANGING AN OPTICAL PATH LENGTH FOR USE IN SUCH A SYSTEM AND METHOD

(75) Inventors: Frank Holler, Aalen (DE); Jurgen Werner, Aalen (DE); Edward Gumbrell, Aalen (DE); Michael Spieweck, Aalen (DE)

(73) Assignee: Carl Zeiss AG, Oberkochen (DE)

( * ) Notice: Subject to any disclaimer, the term of this patent is extended or adjusted under 35 U.S.C. 154(b) by 978 days.

(21) Appl. No.: 10/120,253

(22) Filed: Apr. 10, 2002

(65) Prior Publication Data
US 2002/0179866 A1 Dec. 5, 2002

(30) Foreign Application Priority Data
Apr. 13, 2001 (DE) ................. 101 18 392

(51) Int. Cl.
*G01N 21/86* (2006.01)
*G01B 9/02* (2006.01)
(52) U.S. Cl. .................. 250/559.33; 356/493
(58) Field of Classification Search .......... 250/559.33, 250/559.29–559.32; 356/493, 152.3, 508
See application file for complete search history.

(56) References Cited

U.S. PATENT DOCUMENTS

| | | | |
|---|---|---|---|
| 3,597,091 A | 8/1971 | Bowker | 356/106 |
| 3,729,248 A | 4/1973 | Beduchaud | 350/7 |
| 4,494,821 A | 1/1985 | Lewis et al. | 350/6.5 |

(Continued)

FOREIGN PATENT DOCUMENTS

DE 43 13 076 A1 10/1993

(Continued)

OTHER PUBLICATIONS

Payne, J.M. et al., "Rangefinder with Fast Multiple Range Capability," Rev. Sci. Instrum., vol. 63, No. 6, Jun. 1992.

(Continued)

*Primary Examiner*—Thanh X Luu
(74) *Attorney, Agent, or Firm*—Osha Liang LLP

(57) ABSTRACT

A system and a method for determining a position of two objects relative to each other is suggested, comprising: a source 43 of coherent radiation, a beam guidance for providing a measuring branch 49 for a measuring beam, which has an optical path length dependent on the position of the two objects, a radiation intensity sensor 65 for measuring an intensity of an interfering superposition of radiation, which include radiation at least after passing through the measuring branch 49, and a calculator 67 which responds to a measuring signal from the radiation intensity sensor 65, in order to detect optical path lengths of the measuring branch 49 and therefrom to detect the position of the two objects relative to each other, wherein the measuring branch 49 includes: at least one emitter fixedly mountable on a first of the two objects for emitting radiation supplied to the measuring branch 49 in a space between the two objects, at least three retroreflectors 19 mountable on the second one of the two objects, such that they are arranged at fixed distances relative to each other, and at least one receiver 18 mountable on the first of the two objects for receiving radiation reflected back by the retroreflectors 19 and for supplying the received radiation to the radiation intensity sensor 65, wherein the emitter 18 emits the radiation into such an angular area that the at least three retroreflectors 19 are contained therein.

45 Claims, 13 Drawing Sheets

U.S. PATENT DOCUMENTS

| | | | | |
|---|---|---|---|---|
| 4,533,242 | A | * | 8/1985 | McLauchlan et al. ...... 356/5.07 |
| 4,621,926 | A | * | 11/1986 | Merry et al. ................. 356/508 |
| 4,647,206 | A | * | 3/1987 | Kunzmann et al. ......... 356/500 |
| 4,681,445 | A | | 7/1987 | Perkins ........................ 356/346 |
| 4,691,446 | A | | 9/1987 | Pitches et al. ................. 33/516 |
| 4,824,251 | A | | 4/1989 | Slotwinski et al. .......... 356/349 |
| 4,884,889 | A | | 12/1989 | Beckwith, Jr. |
| 4,932,783 | A | | 6/1990 | Kersey et al. ............... 356/345 |
| 4,939,678 | A | * | 7/1990 | Beckwith, Jr. ............... 702/95 |
| 5,007,721 | A | | 4/1991 | Morris et al. ............... 350/486 |
| 5,062,153 | A | | 10/1991 | Turpin et al. ............... 359/156 |
| 5,070,483 | A | * | 12/1991 | Berni ........................... 367/14 |
| 5,153,769 | A | | 10/1992 | Rubinstein et al. .......... 359/226 |
| 5,214,279 | A | | 5/1993 | Hakamata .................... 250/234 |
| 5,220,406 | A | * | 6/1993 | Kishner ....................... 356/513 |
| 5,267,143 | A | * | 11/1993 | Pryor .......................... 700/56 |
| 5,270,789 | A | | 12/1993 | Falco et al. .................. 356/345 |
| 5,321,501 | A | | 6/1994 | Swanson et al. |
| 5,455,670 | A | | 10/1995 | Payne et al. ................. 356/5.1 |
| 5,459,570 | A | | 10/1995 | Swanson et al. ............. 356/345 |
| 5,465,147 | A | | 11/1995 | Swanson ..................... 356/345 |
| 5,486,918 | A | | 1/1996 | Nagashima .................. 356/346 |
| 5,491,524 | A | | 2/1996 | Hellmuth et al. ............ 351/212 |
| 5,515,459 | A | | 5/1996 | Farhadiroushan ............ 385/12 |
| 5,793,483 | A | | 8/1998 | Zehnpfennig et al. |
| 5,808,740 | A | | 9/1998 | Tanaka et al. ............... 356/358 |
| 5,907,423 | A | | 5/1999 | Wang et al. ................. 359/203 |
| 6,057,919 | A | * | 5/2000 | Machida et al. ............. 356/450 |
| 6,173,091 | B1 | | 1/2001 | Reich ........................... 385/12 |
| 6,191,862 | B1 | | 2/2001 | Swanson et al. ............. 356/450 |
| 6,201,609 | B1 | | 3/2001 | Hill et al. .................... 356/491 |
| 6,460,004 | B2 | * | 10/2002 | Greer et al. .................. 702/104 |
| 2002/0085208 | A1 | | 7/2002 | Hauger et al. ............... 356/479 |

FOREIGN PATENT DOCUMENTS

| | | |
|---|---|---|
| DE | 42 24 190 A1 | 1/1994 |
| DE | 197 05 889 A1 | 8/1998 |
| DE | 692 27 902 T2 | 6/1999 |
| DE | 100 28 502 A1 | 1/2001 |
| EP | 0 705 562 A1 | 4/1996 |
| GB | 2 102 574 A | 2/1983 |
| GB | 2 348 515 A | 10/2000 |
| JP | 57-008407 | 1/1982 |
| JP | 60129614 | 7/1985 |
| JP | 3-501052 | 3/1991 |
| JP | 3-130690 | 6/1991 |
| JP | 05-312953 | 11/1993 |
| JP | 06-511312 | 12/1994 |
| JP | 7-332923 | 12/1995 |
| JP | 11-504118 | 4/1999 |
| SU | 1739165 A1 | 6/1992 |
| WO | WO-88/07656 | 10/1988 |
| WO | WO88/07656 | 10/1988 |
| WO | WO92/19930 | 11/1992 |
| WO | WO93/22637 | 11/1993 |
| WO | WO96/35100 | 11/1996 |

OTHER PUBLICATIONS

Patent Abstract of Japan, Publication No. 60129614A, Publication Date Jul. 10, 1985, 1 page.

Patent Abstract of Japan, Publication No. 07043134A, Publication Date Feb. 10, 1995, 1 page.

Patent Abstract of Japan, Publication No. 2001153605A, Publication Date Jun. 8, 2001, 1 page.

European Search Report dated Sep. 23, 2002, 3 pages.

German Search Report dated Jul. 1, 2002, 3 pages.

Patent Abstracts of Japan, Publication No. JP60129614 dated Jul. 10, 1985, 1 page.

English translation of an Office Action dated Aug. 6, 2007 issued by the Japanese Patent Office in Japanese Application No. 2002-104061, 5 pages.

English Patent Abstract of JP3-130690 from esp@cnet, published Jun. 4, 1991, 1 page.

English Patent Abstract of JP57-8407 from esp@cnet, published Jan. 16, 1982, 1 page.

* cited by examiner

SYSTEM AND METHOD FOR DETERMINING A POSITION OR/AND ORIENTATION OF TWO OBJECTS RELATIVE TO EACH OTHER AS WELL AS BEAM GUIDING ARRANGEMENT, INTERFEROMETER ARRANGEMENT AND DEVICE FOR CHANGING AN OPTICAL PATH LENGTH FOR USE IN SUCH A SYSTEM AND METHOD

FIELD OF THE INVENTION

The invention relates to a system for interferometrically determining a position of two objects relative to each other. In particular, the invention relates to a system for interferometrically determining position as well as orientation of the two objects relative to each other. Furthermore, the invention relates generally to a method for determining position and orientation of two objects relative to each other on the basis of at least nine distances detected between the two objects. This method is applicable particularly in the system for determining position and orientation of the two objects relative to each other.

Furthermore, the invention relates generally to a beam guiding arrangement for supplying radiation emitted from a light source to a measuring head, the light source and measuring head being displaceable relative to each other or/and the beam guiding arrangement being exposed to changing environmental influences. The beam guiding arrangement is applicable particularly in a sensor system or in the system for determining position or/and orientation of the two objects relative to each other. Further, the invention relates to an interferometer arrangement having such a beam guiding arrangement.

Further, the invention generally relates to a device for providing a variable optical path length or a device for providing a variable optical delay, respectively, which is applicable particularly in the system for determining position or/and orientation of the two objects relative to each other.

Further, the invention relates to a coordinate measuring instrument and a machine tool which uses the system for determining the position or/and orientation of the two objects relative to each other.

BACKGROUND OF THE INVENTION

It is known to detect by interferometer variations in distances between two objects, in that at one of the objects a retroreflector is mounted, and at the other one of the two objects an emitter for coherent radiation is provided which is directed to the retroreflector. The radiation retroreflected by the retroreflector towards the other object is received via a respective receiver, made to superimpose the radiation of the source by interference and detected by means of a radiation intensity sensor. In the case of a change in the distance between the two objects, the optical path length of the beam reflected back and forth between the two objects, so that due to the interference intensity maximums and minimums are generated. If the number of intensity variations is detected, a conclusion can be drawn to the magnitude of the variation in distance. A measurement of the absolute distance between the two objects is possible, if in a reference run the two objects are initially placed in a predetermined known distance from each other and then the variations from the known distance are detected.

From WO 88/07656 a system is known for detecting relative changes in position and orientation of two objects relative to each other. For this purpose, the retroreflectors are mounted on the first object at a distance from each other, and on the second object six separate interferometer-emitters are provided at a distance from each other, the radiation of each of which is directed to one of the retroreflectors. Herein the first, second and third emitters each direct their radiation to the first retroreflector, the fourth and the fifth emitters direct their radiation to the second retroreflector and the sixth emitter directs its radiation to the third retroreflector. Thus, by providing the six interferometers, a variation of six different distances between locations on the first or second object, respectively, can be detected. If the distance between the different locations on the two objects in a reference position was known at the beginning of a measurement, then after displacing the two objects relative to each other the six distances can be determined absolutely. Then, from the absolute values of the six distances, the position and the orientation of the two objects relative to each other can be determined.

If an interruption of one of the six beams occurs in this system during a variation in the distance or orientation, respectively, for example due to environmental influences, the intensity maximums or minimums, respectively, can no longer be counted, so that a determination of the absolute distance between the two objects is no longer possible from this point in time. Further, each emitter must direct its radiation to that only retroreflector which is assigned to it exclusively, so that the emitter comprises a corresponding beam direction control, in order to maintain its radiation constantly directed to the corresponding retroreflector. In the case of beam interruption, the direction control can lose contact with the corresponding retroreflector.

If the coherent radiation is supplied to the emitter by a conventional one-mode light conductor and finally by the latter is supplied to the detector, a change in the transmission properties of the light conducting fiber occurs also in the case of a variation of the relative position between source and detector on the one hand and emitter on the other hand, or by other environmental influences. A consequence thereof may be that the signal supplied to the detector is subjected to strong fluctuations, which are also interpreted as intensity maximums or minimums, respectively, caused by movement between the two objects. This also leads to faulty measurement of the distance variation.

From the six detected distances, the determination of the position and the orientation of the two objects relative to each other by means of an iterative calculation process is possible, such as a conventional Gauss-Seidel method. Such a method requires much calculation and limits the speed with which the detected position or orientation, resp., per time unit can be updated.

SUMMARY OF THE INVENTION

Further, interferometric methods have been known in which the distance between two objects provides an optical path in a measuring branch of the interferometer and in which this optical path is compared to a known variable optical path provided in a reference branch of the interferometer, so that in this manner a determination of the absolute distance between the two objects is possible. The devices known for this purpose of providing an optical path in the reference branch have too small a deviation on the one hand, i.e. the deviation range of the optical path length is too small to be able to adjust great variations in distance between the two objects, or/and they are too slow on the other hand, in order to be able to quickly provide great variations in the optical path, which in turn limits the distance measuring rate.

Accordingly, it is an object of the present invention to provide a trouble-free system for determining a position of two objects relative to each other. It is a further object to provide such a system which allows the measurement of an absolute distance. It is another object to provide such a system which is able to determine also the orientation of the two objects relative to each other.

It is a further object of the invention to provide a method for determining the position or/and the orientation of the two objects relative to each other which requires little calculation expenditure.

It is another object of the invention to suggest a beam guiding arrangement having a light guiding arrangement, which is less susceptible to displacements of the light guiding arrangement or/and other environmental influences on the light guiding arrangement. It is another object of the invention to suggest an interferometer arrangement whose measuring branch is displaceable relative to the radiation source and is less susceptible to failure.

It is another object of the present invention to suggest a device for providing a variable optical path length which provides a great deviation. Further, it is an object of the invention to suggest such a device which allows for rapid variation of its deviation.

Under a first aspect, the invention provides a system for determining a position of two objects relative to each other, wherein at least three distances are interferometrically determined between at least one location on a first of the two objects and at least three locations on the second of the two objects. For this purpose a source having sufficiently coherent radiation is provided, in order to generate an interference signal dependent on the distances of the locations. For this, radiation deviated from the source is superimposed on radiation which has passed through a measuring branch, which includes as optical path the distances between the locations provided on the first object on the one hand and on the second object on the other hand. A computer evaluates the resulting interference signal and determines therefrom the distances between the corresponding locations and therefrom, in turn, the position of the two objects relative to each other. The locations on the second object are determined by at least three retroreflectors mounted thereon, whose distances from each other are predetermined and known. The locations predetermined on the first object are, for one thing, an emitter for radiation provided by the source which emits this radiation into such an angular range of three-dimensional space, or a steradian, respectively, that the at least three retroreflectors are contained in this angular range. Here, the angular range is dimensioned so great that the retroreflectors therein are still contained in the angular range even in the case of a relative displacement of the two objects in an intended displacement volume. As a further location a receiver for radiation is predetermined at the first object for receiving radiation emitted by the emitter and reflected back by the retroreflector and finally supplies it to the radiation intensity sensor for superposition with further radiation deviated from the source.

By the at least one emitter emitting its radiation into the angular range which contains the at least three retroreflectors, a beam directing means is not absolutely necessary, which conventionally selectively supplies a measuring beam to merely one retroreflector and must be controlled correspondingly, in order to follow this retroreflector constantly.

Nevertheless, at least three distances between locations of the first and the second object can be determined interferometrically, wherein—using further information—the positions of the objects relative to each other are clearly derivable.

It is particularly provided that the locations of the emitter and the receiver coincide, in that these two components are combined to form a common assembly. On the other hand it may also be preferred to design these components as separate assemblies mounted at a fixed and known distance relative to each other on the first object.

If apart from the position of the two objects relative to each other also their orientation relative to each other is to be determined, at least three locations having a fixed and known distance relationship are provided at the first object, so that at least six and preferably at least nine distances are determinable between the two objects.

For this it is particularly provided that at least three emitters are arranged at a distance from each other at the first object, or at least three receivers. Also in this case one each emitter and receiver may be combined to form one assembly, or one emitter together with at least three receivers or one receiver with at least three emitters can be provided together at the first object.

Further information which might become necessary in view of the clarity of the determination of position or orientation, respectively, can be given by a position or orientation, respectively, which both objects have assumed in a preceding measuring step.

Preferably however, measures are provided in order to selectively interrupt at least one beam in the measuring branch, so that the interference signal corresponding to this beam no longer occurs. Thereby, this no longer occurring interference signal can be assigned clearly to a distance between two locations provided at the two objects.

Preferably this is carried out by a changeover switch which, if several emitters are provided at the first object, supplies the radiation to a selectable subset of the emitters. If several receivers are provided at the first object, a changeover switch is preferably provided which supplies the radiation received from a selectable subset of the receivers to the subsequent interfering superposition. Also, it is preferred to provide a radiation interrupter between the source and a subset of the emitters, which alternatively effects an interruption of the radiation supplied to one or several emitters. Further, it is also preferred to provide the radiation interrupter when providing several receivers between the corresponding receiver and the location of the interfering superposition of the radiation.

Alternatively, it is also preferred to design at least one subset of the retroreflectors in a way that they can be switched between a first condition, in which they reflect back incoming radiation and a second condition in which they do not reflect back incoming radiation.

Further, it is possible to alternatively interrupt an interruption of at least one subset of beams traveling back and forth between the two objects, for example by a mechanical chopper.

In view of an absolute measurement of the distances between the locations provided at both objects, it is preferred to compare the optical paths occurring in the measuring branch in dependence on the distances with an optical reference length separately provided by the system as a reference. Preferably, this optical reference path length is adjustable.

Then the system works preferably according to the principle of optical coherence tomography or white light interferometry.

Preferably, the system comprises for this a beam splitter for splitting radiation emitted from the source in a reference branch to which a reference beam is supplied accordingly, as well as in the previously described measuring branch to which the measuring beam is supplied which passes back and forth on the optical path between the two objects. In the reference branch the device for providing the variable optical path length is then provided.

Alternatively, it is also preferred to provide the device for providing the variable optical path length between the source and the emitter, the emitter being supplied two partial beams of the radiation emitted by the source, namely a first partial beam which has passed through the device for providing the variable optical path length, and a second partial beam which has not yet passed through this device. Thus, the emitter radiates wave trains, which comprise a fixed coherence relationship or phase relationship, respectively, between sections arranged in the direction of propagation of the radiation at a spatial distance. The radiation intensity sensor then registers an intensity maximum, when an optical path length difference is provided in the measuring branch which corresponds to the variable optical path length.

Under another aspect, the invention provides a method for determining the position and the orientation of the two objects relative to each other. This method starts from the fact that at least nine distances between at least three different locations are determined on the side of the first object on the one hand, and at least three different locations on the side of the second object on the other hand.

The manner in which these at least nine distances are determined may be any process which is not restricted to an interferometric determination. This method for determining the distances can include a running time measurement, for example, or the like. Preferably, however, an interferometric method is used, for example by determining the number of occurring intensity maximums and minimums. The distances can also be detected by comparison with a reference distance, for example by a white light interferometry method.

The method distinguishes itself under this aspect in that the position and orientation of the two objects relative to each other are carried out by a non-iterative computation. This non-iterative computation has the advantage that the computation time required for the execution does not depend on the convergence criteria of an iteration and thus is always essentially the same and in general the result is obtained more quickly than in the comparable iterative method. The conventional methods calculate the position and orientation iteratively on the basis of at least six distances between the two objects. In contrast thereto the invention provides that the computation is based on at least nine detected distances, but is carried out non-iteratively.

For this, a data structure is preferably calculated at first, which is merely derived from predetermined distances of the locations fixed at the first object on the one hand and on the other hand from the predetermined distances of the locations fixed at the second object of the locations. This first generated data structure is thus independent of the position or orientation, resp., of the two objects relative to each other. Generating this data structure can be relatively demanding and may claim much computing time, since it is to be carried out only once at the beginning of a series of multiple measurements and calculation of changing positions and orientations. If then positions and orientations are to be determined which have changed several times in quick succession, comparatively few calculating operations are necessary every time, in that at first from the detected distances another data structure is determined which depends on. The position and the orientation of the two objects relative to each other are then determined by a calculation involving the position/orientation-independent data structure and the position/orientation-dependent data structure. All computing steps of the method proceed non-iteratively.

Under another aspect the invention provides a beam guiding arrangement including a light guiding arrangement for guiding light from a source to a first end of the light guiding arrangement at the object side, where at first it randomly reciprocates with an object, is resumed by the first end of the light guiding arrangement and supplied to a detector by this light guiding arrangement, in order to detect changes in the properties of the light returning from the object. The beam guiding arrangement is thus particularly applicable in a sensor in which the light from a source is supplied as object to a sample volume or sample medium and then the light influenced by the sample volume or test medium is supplied to the detector. The test volume or test medium can be intended for detecting random physical effects, such as pressure, temperature or chemical compositions, for example, and the like. The sensor can also be a distance sensor in which a reflecting object is arranged as measuring medium having a distance from the object end of the light guiding arrangement and in which the optical path length between the object end and the object is to be determined.

The advantage of the beam guiding arrangement of the invention is given especially when the light guiding arrangement is not kept stationary, but when it is exposed to displacements, such as bending or impact of pressure or other environmental influences.

In conventional beam guiding arrangements in which substantially unpolarised light is supplied to the object side end of the light guiding arrangement, the light guiding arrangement is a non-polarization maintaining light conductor. In the case of displacements or environmental influences, the birefringent properties of the light conductor change, so that between various conditions of polarization phase differences occur in the light traveling back and forth through the light conductor, which bring about destructive interference and thus signal breaks due to displacement and environmental influences. The inventors have realized that this problem can be solved for the greatest part in that the light is supplied through a polarization-maintaining light conductor at the object-side end. Such a polarization-maintaining light conductor is biased in view of its birefringent properties, so that the doubly diffracting properties remain substantially unchanged by displacement and other environmental influences. The unpolarized light entering the polarization-maintaining light conductor is split therein into its two conditions of polarization and travels the path toward the object-side end in the polarization-maintaining light conductor, wherein quite different optical path lengths can be provided for the two conditions of polarization in the light conductor.

Between the exit at the object-side end of the light and its renewed entry into the object-side end, the light is turned by providing a phase plate arrangement having the effect of a half-wave plate, such that the light which on its way there has passed through a polarization channel of the light conductor, passes through the other polarization channel on its return path and vice versa. Thus, both conditions of polarization of the light travel through both polarization channels on their way there and back exactly once, and thus they travel substantially identical optical path lengths each. Through changing the position of the polarization-maintaining light conductor and the environmental influences on the latter, the previously described destructive interference occurring in the conventional light conductor is largely avoided.

Preferably, a quarter-wave plate is provided in front of the object-side end of the polarization-maintaining light conductor, which plate is passed through once between the exit of the light at the object-side end and the object, and which is again passed through by the light on its path from the object back to its entry into the object-side end, so that the overall effect is that of a half-wave plate. This beam guiding arrangement is preferably used in the system for determining the position or/and orientation of the two objects relative to each other, when the emitter and the receiver are combined in one assembly and the latter is displaceable relative to the source. Herein, the emitter-receiver assembly together with one of the retroreflectors acts as distance sensor.

However, the beam guiding arrangement is preferably used in an interferometry arrangement of a general type, in which the interferometry branches comprise components which are displaceable relative to each other, wherein it is further preferred that the interferometry arrangement be a white light interferometry arrangement or an optical tomography arrangement, resp.

According to another aspect, the invention provides a device by which an optical path length can be varied comparatively quickly or/and in a comparatively large range. Thus, viewed from a different aspect, the invention provides a variable optical delay.

Under a first partial aspect, the invention starts from a belt scanner which includes an endless belt tensioned between two rollers distanced from each other such that it extends along a common tangent at the two rollers in a substantially straight line and there forms a working range. On the belt at least more mirror arrangement is fixedly mounted revolves about the rollers which are powered by means of a drive, so that the belt moves in a straight line in the working range. Further, a beam guiding device is provided in order to direct a light beam parallel to a direction of extension of the belt in the working range such that the light beam impinges on the mirror arrangement, when it is arranged in the working range. Therein the mirror arrangement and the beam guiding device are arranged relative to each other such that the light beam reflected back by the mirror arrangement reenters the beam guiding arrangement.

Herein, the invention distinguishes itself in that a second mirror arrangement is provided fixedly arranged with respect to the beam guiding device and the first and the second mirror arrangement are each designed such that the light beam between its exit from the beam guiding arrangement and its entry into the latter is reflected back and forth at least once between the first and the second mirror arrangement.

Herein at a given length of the working range of the optical path length provided by the device is variable in a relatively wide range, which corresponds particularly to at least twice the length of the working range.

Therein, the mirror arrangement mounted on the belt includes preferably at least two reflectors arranged in orthogonal relationship to the belt and offset in the working range, and the mirror arrangement disposed at the beam guiding device includes at least one reflector which is also offset orthogonal with respect to the direction of extension of the belt in the working range.

In order to achieve that the highest possible beam intensity is again coupled into the beam guiding device, the reflector is arranged at approximately half the optical path length of the light beam between its exit from the beam guiding device and its entry therein, is formed as a retroreflector. This retroreflector is preferably formed by three pairs of plane mirrors, each pair arranged orthogonal to each other.

The reflectors of the first and second mirror arrangement, which are not designed as retroreflectors, are preferably designed as two plane mirrors in orthogonal relationship to each other.

The device is preferably designed such that the time is as long as possible, in which a mirror arrangement is available in the working range for reflection of the light beam back into the beam guiding device which time can also be termed the duty factor of the device. This means that times are as short as possible in which just no mirror arrangement is present in the working range. On the other hand, there should not be two mirror arrangements in the working range at the same time, since then in the case of a given length of the working range only a partial area thereof can be used for providing the variable optical path length. In view of that it would be advantageous to adjust a distance between two mirror arrangements arranged adjacent on the circumference of the belt such that this distance corresponds to a distance e of the axes of the two rollers from each other.

However, before the mirror arrangement enters into the working range it moves in a circular path around one of the rollers, which is connected with a variation of the acceleration acting on the mirror arrangement at its transition into the working range, which in turn can lead to oscillations of the mirror arrangement on the belt. Considering this, it may be advantageous to select the distance between adjacent mirror arrangements smaller than the axial distance e of the two rollers. $0.9 \cdot e$ has turned out to be advantageous as a lower limit for the selection of the distance.

On the other hand, it may be advantageous to select the distance between subsequent mirror arrangements to be greater than the distance e of the two rollers from each other, so that there is a time when after an exit of a preceding mirror arrangement from the working range a subsequent mirror arrangement has not yet entered the working range. This time can then be used for switching the electronics or the beam guidance of radiation exiting the device, so that after the passage of the period of rotation then the subsequent mirror arrangement enters the working range and its complete path through the working range can be used as a variation of the optical path length. As an upper limit for the distance of the two mirror arrangements from each other, a value of $1{,}2 \cdot e$ and preferably $1{,}1 \cdot e$ has turned out to be advantageous.

A preferred coordination of the belt length and the diameter of the rollers in four mirror arrangements arranged on the belt is given, when the distance e of the two rollers from each other has a value $e = a \cdot D$, D being the diameter of the two rollers and a being a number from the range of 1.3 to 1.4.

In order to achieve high rotational speeds of the belt and, thus, a rapid change of the optical path length at precise guidance of the mirror arrangements in view of high measuring accuracy, the belt is preferably designed as a metal band.

Under another partial aspect the invention provides a device for providing a variable optical path length which has a first mirror with a mirror surface extending spirally about an axis. Radially within the spiral mirror surface, a beam guiding device rotatable relative to the spiral mirror is provided, the beam guiding device directing a light beam to the spiral mirror under an adjustable circumferential angle. The spiral mirror reflects the radiation directed towards it back onto a second mirror which is rotatably arranged together with the beam guiding arrangement with respect to the spiral mirror. From this second mirror the light beam is then directed back to the spiral mirror such that it reflects this light beam again, namely back to the beam guiding device which the beam enters in order to leave the device therethrough.

By changing the rotational position of the beam guiding device and the second mirror in rotationally fixed connection relative to the spiral mirror, the optical path length becomes variable through which the beam passes between exit and reentry into the beam guiding device.

Preferably, the spiral mirror is fixedly arranged in a housing together with a light source for feeding the beam guiding device and the beam guiding device is rotatably supported with respect to the housing together with a second mirror. Hereby merely a comparatively small mass needs to be driven for rotation, in order to achieve comparatively great variations in the optical path length. The rotating mass can be driven comparatively quickly when it is balanced correspondingly, in order to achieve rapid variations of the optical path length.

Preferably, the spiral mirror comprises the form of a logarithmic spiral, and the second mirror comprises a substantially plane mirror surface, whereby a precise alignment of the light beam reflected back from the spiral mirror to the beam guiding device is made possible and thus an efficient coupling of the beam into the latter.

BRIEF DESCRIPTION OF THE DRAWINGS

Embodiments of the invention are subsequently illustrated with reference to the drawings. The drawings show in FIG. 1 an embodiment of a machine tool according to the invention in which an embodiment of the system for determining the position of two objects relative to each other is integrated, FIG. 2 a detailed view of the system shown in FIG. 1 for determining the position of two objects relative to each other, FIG. 3 a detailed view of a modified system for determining the position of two objects relative to each other, which can furthermore determine the orientation of the two objects relative to each other, FIG. 4 a schematic overall view of the system shown in FIG. 3 for determining position and orientation, FIG. 5 a representation of a section of a retroreflector of the FIGS. 2 and 3

DETAILED DESCRIPTION

Figure 1:
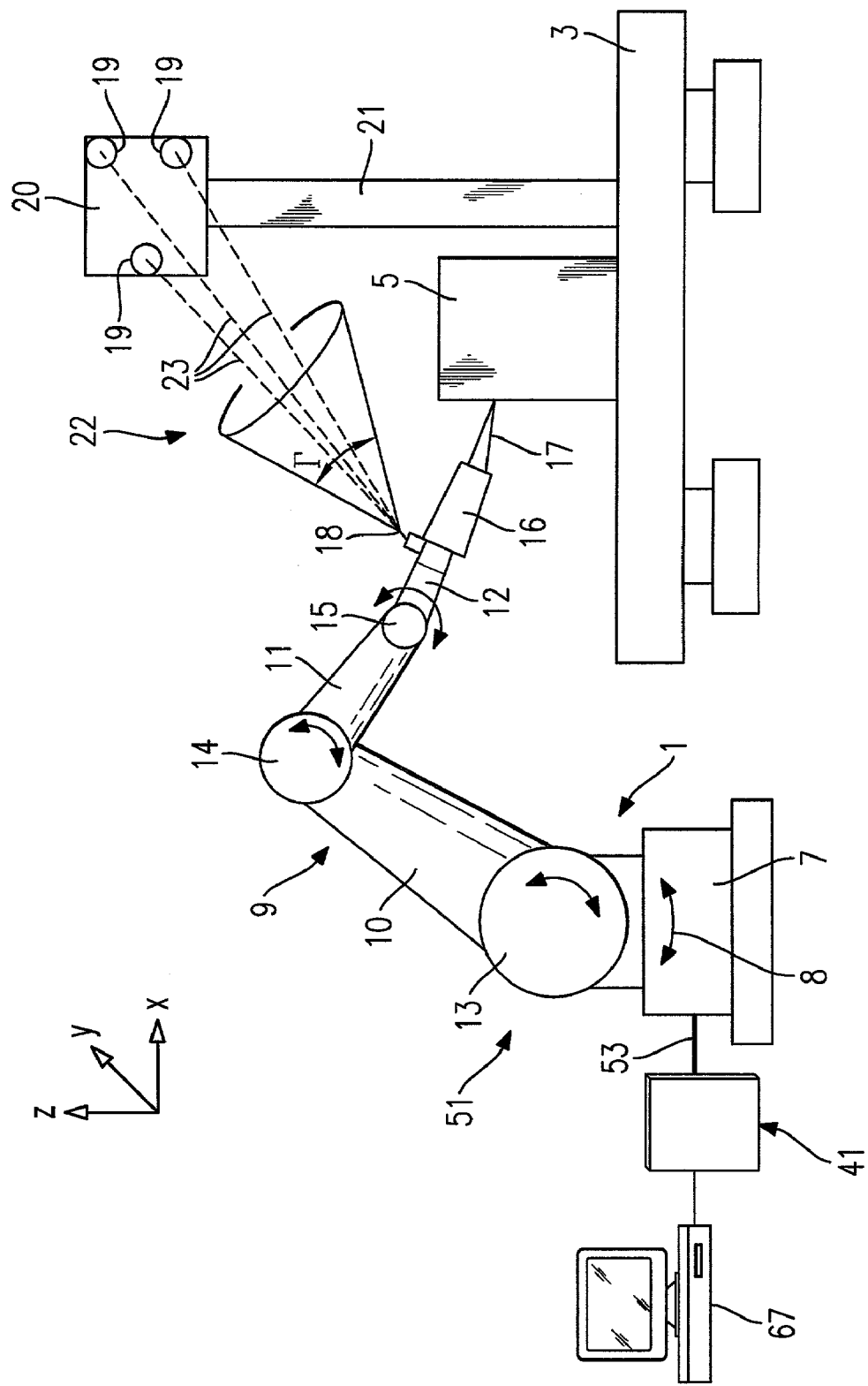

FIG. 1 shows a machine tool 1 for processing a workpiece 5 mounted on a workpiece mounting 3. The machine tool 1 comprises a base 7 on which a processing arm 9 is provided in a way rotatable about a vertical axis z in a direction 8, the arm having several partial arms 10, 11, 12 and joints 13, 14, 15 linking the partial arms. At an end distal with respect to the arm 9 a processing tool 16 is mounted, whose schematically represented tool tip 17 carries out processing at the workpiece 5. In view of precise processing of the workpiece 5 a measuring system 22 for determining the position of the tool 16 relative to the workpiece 5 or the workpiece mounting 3, respectively, is provided. The position measuring system 17 includes a radiation emitter 18 on the one hand, which is fixed on the tool 16 of the machine tool 1, and three retroreflectors 19 on the other hand, which are mounted in a fixed spatial relationship to each other on a holding plate 20 for the retroreflectors 19, such that they do not lie in a common straight line, i.e. that they do not span or define in a plane. The holding plate 20 for the retroreflectors 19 is fixedly connected to the workpiece mounting 3 via a holding rod 21.

The radiation emitter 18 emits its radiation in an angular range of three-dimensional space having an apex angle F selected to be so great that all retroreflectors 19 are hit by radiation at the plate 20, also when the tool arm 9 carries out displacements in order to displace the tool 16 in a processing volume of the machine tool, wherein the emitter 18 is displaced relative to the retroreflectors 19. The radiation emitted from the emitter 18 and impinging on a retroreflector 19 is reflected back from this retroreflector 19 as a light beam 23 directed back to the emitter 18. The emitter 18 is combined with the radiation receiver to form an assembly, wherein the radiation receiver is provided to receive the light beams 23 reflected back by the retroreflectors 19 and to further process them in an optical system 41 and to evaluate them in a computer 67. It is the object of the evaluation to determine the distances between the emitter-receiver assembly 18 on the one hand and the three retroreflectors 19 on the other hand. These distances each correspond to half of the optical path lengths which the beams 23 cover when they pass through the distances between the emitter 18 and the retroreflectors 19 and back again to the emitter-receiver assembly 18. From these three distances the position of the emitter-receiver assembly 18 and thus the tool 16 and thus in turn the tool tip 17 can be determined relative to the workpiece 5 in coordinates x, y, z, as far as the position of the three retroreflectors 19 relative to each other is known.

In such a measurement the position of the tool 16 relative to the workpiece 5, which can be carried out with high accuracy in a corresponding measuring process, it is possible in the reverse case to make correspondingly lower claims on the precision of the drives and position sensors in the joints 13, 14, 15 of the tool arm 9, or it is possible, respectively, to manufacture the workpiece 5 with particularly high precision, since the exact position of the tool tip 17 with respect to the workpiece 5 is constantly known with an accuracy corresponding to the measuring system 22.

Figure 5:
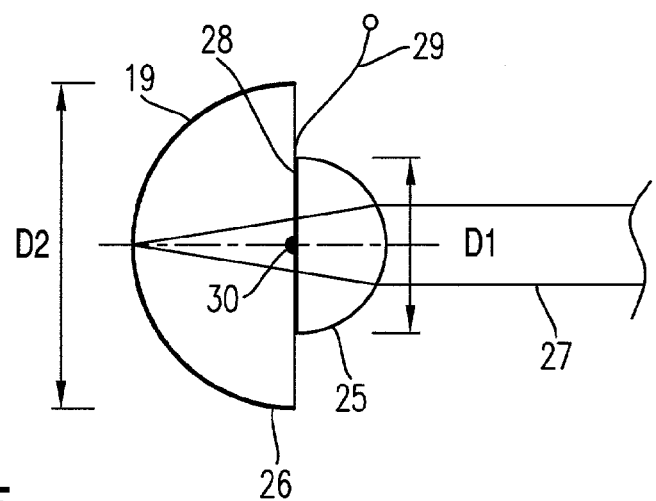

FIG. 5 illustrates the structure of a retroreflector 19 in detail. The retroreflector 19 includes two semi-spheres 25, 26 of glass arranged relative to each other such that their sphere centers coincide in a point 30. The two semi-spheres 25, 26 comprise different diameters, namely the semi-sphere 25 a smaller diameter D1 and the semi-sphere 26 a larger diameter.

Further, in FIG. 5 a beam 27 is represented schematically which is directed to a smaller semi-sphere 25 as parallel beam. The diameters D1 and D2 herein are coordinated such that the curvature of the semi-sphere 25 focuses the beam so that a focal point comes into existence on the spherical surface of the semi-sphere 26. At this spherical surface the beam is retroreflected in itself and correspondingly leaves the retroreflector 19 through the front semi-sphere so that it coincides substantially with the incoming beam 27.

Since the geometrical arrangement of the refracting and reflecting surfaces of the semi-spheres 25, 26 does not change either if there is rotation around the center 30, an incoming beam 27 is reflected back substantially in itself independent of its orientation with respect to the retroreflector 19.

Between the two semi-spheres 25, 26 a liquid crystal layer is arranged, which is switchable via a connector 29 by the computer 67 between a first condition in which the layer 28 is transparent for the radiation 27, so that the retroreflector 19 also fulfills its function as such. In the second switching condition the layer 28 is substantially not transparent for radiation, so that the retroreflector does not provide its function as such. Thus, the retroreflector 19 can be switched on or off via the connector 29.

FIG. 2 shows again in spatial representation in detail the arrangement of the emitter-receiver assembly 18 and the three retroreflectors designated there with 19, 19', 19". The position determining system 22 detects interferometrically the distances between an emitter exit surface of the assembly 18 and the respective centers 30 of the retroreflectors 19, 19' and 19".

The position of the emitter-receiver assembly 18 with respect to the three retroreflectors in the coordinates x, y and z is derivable from the three detected distances.

Figure 3:
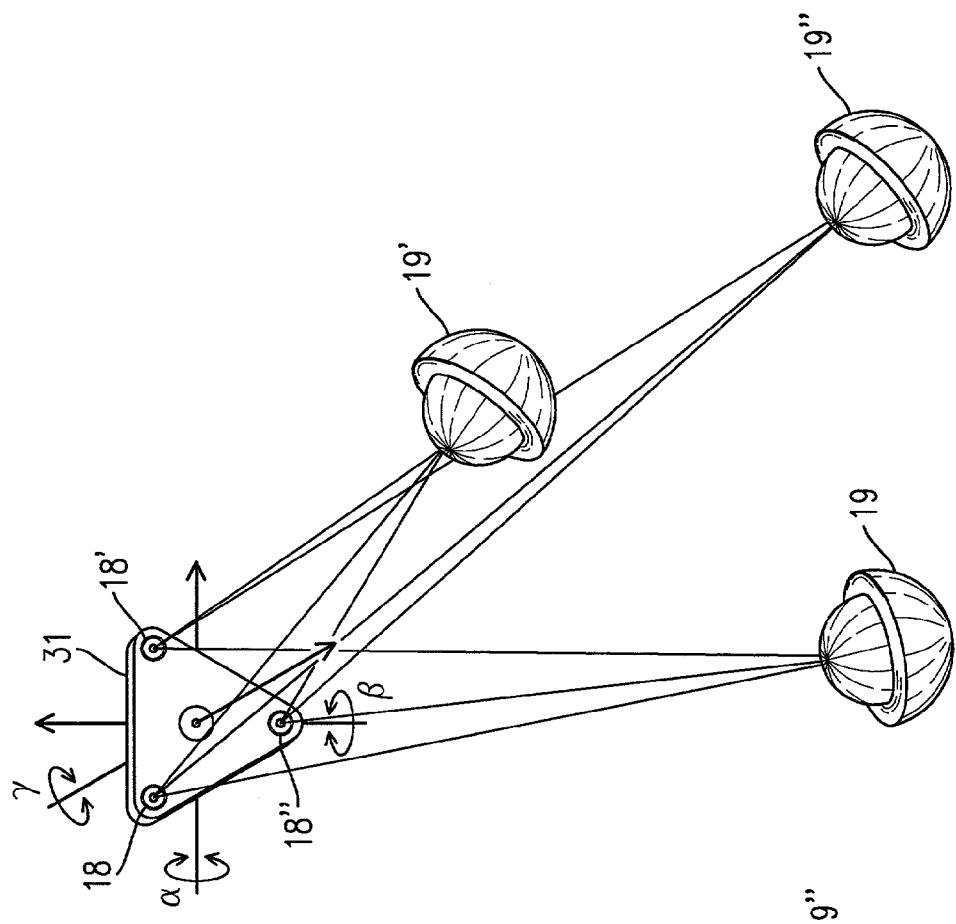
Figure 2:
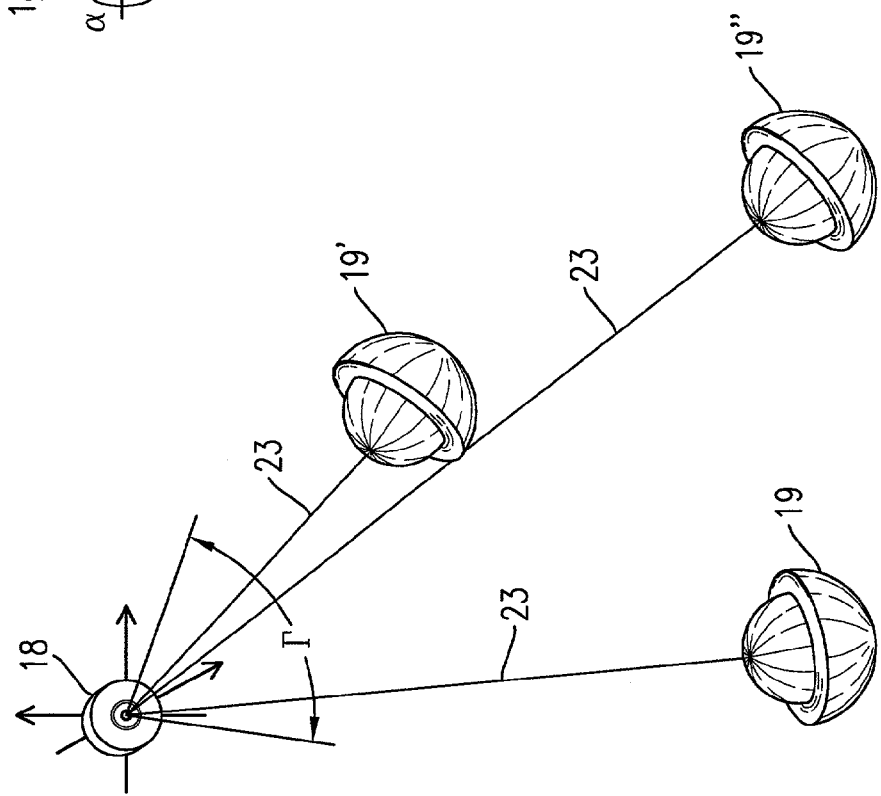

FIG. 3 shows a system similar to that of FIG. 2 for determining the position of two objects relative to each other, wherein however additionally the orientation of the two objects relative to each other can be detected. The system shown in FIG. 3 corresponds to the system shown in FIG. 2 except for the difference that on the side of the tool 16 there is not merely provided an emitter-receiver assembly 18, but that three such assemblies 18, 18', 18" are provided on a mounting plate 31, which is fixedly mounted on the tool 16. The three emitter-receiver assemblies 18, 18', 18" are arranged at a fixed distance from each other such that they do no lie on a common straight line either. Thus, by the three emitter-receiver assemblies 18 a plane is spanned or defined on the side of the tool 16, whose orientation is determinable with respect to the plane spanned by the three retroreflectors arranged on the side of the workpiece mounting 3. This means that aside from the coordinates x, y, z, which state the position of the plate 31 with respect to the retroreflectors 19, angles $\alpha$, $\beta$ and $\gamma$ can be determined, about which the plate 31 is tilted with respect to the plane of the retroreflectors 19.

Also in the system according to FIG. 3 the emitters 18, 18', 18" each emit their radiation into an angular range which is too great by so much that the three retroreflectors 19 are still arranged in this angular range after displacement of the plate 31 with respect to the reflectors 19.

In order to determine the parameters x, y, z, $\alpha$, $\beta$, $\gamma$ characterizing the positions and orientation relative to each other, in principle, measuring at least six distances between the locations is necessary, which on the one hand are predetermined at the tool 16 and on the other hand at the workpiece mounting 3. These can be, for example, the three distances which the emitter 18 has from the three reflectors 19, 19', 19", as well further the two distances which the emitter 18' has from the two reflectors 19 and 19', as well as further the distance which the emitter 18' has from the reflector 19. From six measured distances the six above-mentioned parameters x, y, z, $\alpha$, $\beta$, $\gamma$ are to be determined. For this there is no explicit and closed clear solution, so that the determination of the desired parameters conventionally takes place iteratively according to a Gauss-Seidel method, for example. Such an iterative evaluation requires a relatively great amount of computation time.

It is now intended to calculate the parameters x, y, z, $\alpha$, $\beta$, $\gamma$ through a non-iterative method, wherein however the calculation is carried out on the basis of nine distances, which are measured between at least three locations predetermined on the side of the tool 16 and three on the side of the tool mounting 3. This means that every possible distance between each emitter 18, 18', 18" on the side of the tool 16 and each retroreflector 19, 19', 19" on the side of the tool mounting 3 is at first determined by the system. Let the evaluation process be explained as follows: For this the following abbreviations are introduced:

$$\vec{F}_1 = (F_{1x}, F_{1y}, F_{1z})^T; \quad \vec{F}_2 = (F_{2x}, F_{2y}, F_{2z})^T;$$
$$\vec{F}_3 = (F_{3x}, F_{3y}, F_{3z})^T$$

designates the coordinates of the emitter-receiver assembly 18, 18' and 18", respectively in a coordinate system predetermined on the plate 31, i.e. a coordinate system on the side of the tool.

Correspondingly, $$\vec{R}_1 = (R_{1x}, R_{1y}, R_{1z})^T; \quad \vec{R}_2 = (R_{2x}, R_{2y}, R_{2z})^T;$$
$$\vec{R}_3 = (R_{3x}, R_{3y}, R_{3z})^T$$

describes the coordinates of the centers of the three retroreflectors 19, 19' and 19", respectively, in a coordinate system of the workpiece mounting 3.

The nine measured distances between the assemblies 18, 18', 18" on the one hand and the three retroreflectors 19, 19', 19" on the other hand can then be represented as follows:

$$d_1 = \vec{F}_1 \vec{R}_1; \quad d_2 = \vec{F}_1 \vec{R}_2; \quad d_3 = \vec{F}_1 \vec{R}_3$$

$$d_4 = \vec{F}_2 \vec{R}_1; \quad d_5 = \vec{F}_2 \vec{R}_2; \quad d_6 = \vec{F}_2 \vec{R}_3$$

$$d_7 = \vec{F}_3 \vec{R}_1; \quad d_8 = \vec{F}_3 \vec{R}_2; \quad d_9 = \vec{F}_3 \vec{R}_3$$

Since the emitters 18, 18', 18" as well as the reflectors 19, 19', 19" are each arranged in their own common plane, it is further possible to select $$F_{1z} = F_{2z} = F_{3z} = 0 \text{ und } R_{1z} = R_{2z} = R_{3z} = 0$$

Let the origin of the coordinate system of the reflectors 19 be designated with BO, the origin of the three emitters 18 be designated with PO. The position of the tool 16 with respect to the workpiece mounting 3 can thus be described by a translation vector $$\vec{T} = \overline{{}^B O {}^P O} \in \Re^3$$

wherein $${}^b\vec{T} = ({}^bT_1, {}^bT_2, {}^bT_2)^T;\ {}^p\vec{T} = ({}^pT_1, {}^pT_2, {}^pT_2)^T$$

designates a vector with respect to the coordinate system of the workpiece mounting 3 or with respect to the coordinate system of the tool 16.

Further, it is possible to describe the orientation of the two coordinate systems relative to each other by a rotation matrix, which can be represented as follows:

$$ROT \equiv [I]_P^B \in SO(3) = \begin{pmatrix} {}^p x \cdot {}^b x & {}^p y \cdot {}^b x & {}^p z \cdot {}^b x \\ {}^p x \cdot {}^b y & {}^p y \cdot {}^b y & {}^p z \cdot {}^b y \\ {}^p x \cdot {}^b z & {}^p y \cdot {}^b z & {}^p z \cdot {}^b z \end{pmatrix} = \begin{pmatrix} r_{11} & r_{21} & r_{31} \\ r_{12} & r_{22} & r_{32} \\ r_{13} & r_{23} & r_{33} \end{pmatrix}$$

For the determination of the vector $\vec{T}$ and the matrix ROT from the measured distances d1, . . . dl, first the following equation system must be solved:

$$A\vec{q} = \vec{L}\ \text{bzw.}\ \vec{q} = A^* \vec{L}\ \text{mit}\ A^* = A^T (AA^T)^{-1}$$

The matrix A, which is to be inverted in the course of the calculation, is established herein such that it is independent of the distances d1, . . . , dl and merely includes components which are dependent on the coordinates of the emitters 18 in their own coordinate system and the coordinates of the reflectors 19 also in their own coordinate system. A possible selection for the matrix A is given as follows:

$$A = \begin{pmatrix} R_{1x} & R_{1y} & F_{1x} & F_{1y} & R_{1x} \cdot F_{1x} & R_{1x} \cdot F_{1y} & R_{1y} \cdot F_{1x} & R_{1y} \cdot F_{1y} & 1 \\ R_{2x} & R_{2y} & F_{1x} & F_{1y} & R_{2x} \cdot F_{1x} & R_{2x} \cdot F_{1y} & R_{2y} \cdot F_{1x} & R_{2y} \cdot F_{1y} & 1 \\ R_{3x} & R_{3y} & F_{1x} & F_{1y} & R_{3x} \cdot F_{1x} & R_{3x} \cdot F_{1y} & R_{3y} \cdot F_{1x} & R_{3y} \cdot F_{1y} & 1 \\ R_{1x} & R_{1y} & F_{2x} & F_{2y} & R_{1x} \cdot F_{2x} & R_{1x} \cdot F_{2y} & R_{1y} \cdot F_{2x} & R_{1y} \cdot F_{2y} & 1 \\ R_{2x} & R_{2y} & F_{2x} & F_{2y} & R_{2x} \cdot F_{2x} & R_{2x} \cdot F_{2y} & R_{2y} \cdot F_{2x} & R_{2y} \cdot F_{2y} & 1 \\ R_{3x} & R_{3y} & F_{2x} & F_{2y} & R_{3x} \cdot F_{2x} & R_{3x} \cdot F_{2y} & R_{3y} \cdot F_{2x} & R_{3y} \cdot F_{2y} & 1 \\ R_{1x} & R_{1y} & F_{3x} & F_{3y} & R_{1x} \cdot F_{3x} & R_{1x} \cdot F_{3y} & R_{1y} \cdot F_{3x} & R_{1y} \cdot F_{3y} & 1 \\ R_{2x} & R_{2y} & F_{3x} & F_{3y} & R_{2x} \cdot F_{3x} & R_{2x} \cdot F_{3y} & R_{2y} \cdot F_{3x} & R_{2y} \cdot F_{3y} & 1 \\ R_{3x} & R_{3y} & F_{3x} & F_{3y} & R_{3x} \cdot F_{3x} & R_{3x} \cdot F_{3y} & R_{3y} \cdot F_{3x} & R_{3y} \cdot F_{3y} & 1 \end{pmatrix}$$

Since in the scope of the calculation to be carried out merely the matrix A is to be inverted and it contains only magnitudes which are independent of the measured distances, this matrix can be established and inverted before the actual distance measurement.

The measured distances merely enter into the vector L, which in the actual distance measurement is to be multiplied merely by the already inverted matrix, wherein this multiplication can be carried out comparatively quickly. In the above interpretation of matrix A, the following statement can be chosen for vector L:

$$\vec{L} = \frac{1}{2} \begin{pmatrix} F_{1x}^2 + F_{1y}^2 + R_{1x}^2 + R_{1y}^2 - d_1^2 \\ F_{1x}^2 + F_{1y}^2 + R_{2x}^2 + R_{2y}^2 - d_2^2 \\ F_{1x}^2 + F_{1y}^2 + R_{3x}^2 + R_{3y}^2 - d_3^2 \\ F_{2x}^2 + F_{2y}^2 + R_{1x}^2 + R_{1y}^2 - d_4^2 \\ F_{2x}^2 + F_{2y}^2 + R_{2x}^2 + R_{2y}^2 - d_5^2 \\ F_{2x}^2 + F_{2y}^2 + R_{3x}^2 + R_{3y}^2 - d_6^2 \\ F_{3x}^2 + F_{3y}^2 + R_{1x}^2 + R_{1y}^2 - d_7^2 \\ F_{3x}^2 + F_{3y}^2 + R_{2x}^2 + R_{2y}^2 - d_8^2 \\ F_{3x}^2 + F_{3y}^2 + R_{3x}^2 + R_{3y}^2 - d_9^2 \end{pmatrix}$$

Vector L in turn can be factorized in a vector L1 which is also independent of the measured distances and a vector L2 which contains the squares of the measured distances as components. Vector L1 in turn can be calculated prior to the actual measurement. Then, for the evaluation of a distance measurement merely L2 must be subtracted from L1 to obtain vector L.

The result q of the multiplication of vector L from the right to the matrix A results in the preceding statement:

$$\vec{q} = \left({}^bT_1, {}^bT_2, -{}^pT_1, -{}^pT_2, r_{11}, r_{12}, r_{21}, r_{22}, -\frac{1}{2}\|\vec{T}\|^2\right)^T.$$

Thus, the translation of the tool 16 in view of the workpiece mounting 3 is a result of $$\vec{T} = (T_x, T_y, T_z)^T\ \text{mit}\ T_x = {}^bT_1;$$

$$T_y = {}^bT_2;\ T_z = \sqrt{\|\vec{T}\|^2 - {}^bT_1^2 - {}^bT_2^2}.$$

The elements $r_{31}$ and $r_{32}$ of the rotation matrix are determined as follows:

$$r_{31} = \frac{{}^pT_1 - (r_{11} \cdot T_x) - (r_{21} \cdot T_y)}{T_z};\ r_{32} = \frac{{}^pT_2 - (r_{12} \cdot T_x) - (r_{22} \cdot T_y)}{T_z}$$

Then, the rotation is representable as follows:

$$\begin{pmatrix} r_{13} \\ r_{23} \\ r_{33} \end{pmatrix} = \begin{pmatrix} 0 & -r_{31} & r_{21} \\ r_{31} & 0 & -r_{11} \\ -r_{21} & r_{11} & 0 \end{pmatrix} \begin{pmatrix} r_{12} \\ r_{22} \\ r_{32} \end{pmatrix}$$

Therefrom the angles α, β and γ of a horizontal swing about the x-y- and z-axis can be determined as follows:

$$\beta = -\arcsin(r_{13});\ \alpha = \arcsin\left(\frac{r_{23}}{\cos\beta}\right);\ \gamma = \arcsin\left(\frac{r_{12}}{\cos\beta}\right)$$

Figure 16:
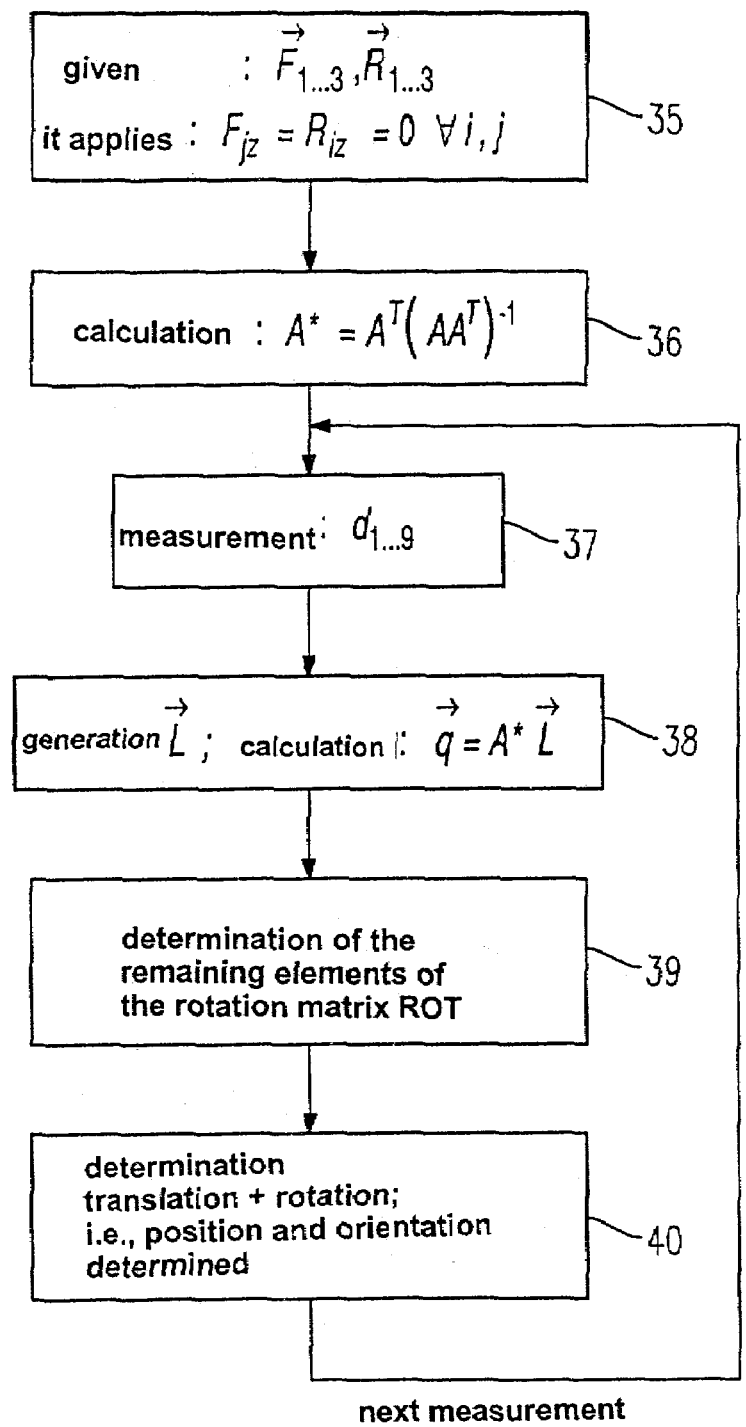

The evaluation method is explained once again with reference to FIG. 16:

At first the coordinates $\vec{F}_{1...3}, \vec{R}_{1...3}$ of the emitter 18 or the reflectors 19, respectively, are detected in their own coordinate system in a step 35. In a step 36 the above-described matrix A is created and the conjugated matrix A* is generated.

The steps 35 and 36 take place before a series of successive measurements, so that the corresponding intense computer work does not have to take place during the measuring series and the evaluation of individual measurements.

A measurement starts in a step 37 with the detection of nine distances d1, ..., d9.

Then, in a step 38 a vector L is generated and the vector $\vec{q} = A^* \vec{L}$ is determined from the product of A* and L. From the vector q the remaining elements of the rotation matrix are determined in a step 39, and in a step 40 the translations x, y. z and the angles of rotation α, β, γ are then determined. This means that then the position as well as the orientation of the tool 16 with respect to the workpiece mounting 3 has been determined.

After conclusion of step 40, one continues with a renewed distance measurement in step 37.

Figure 4:
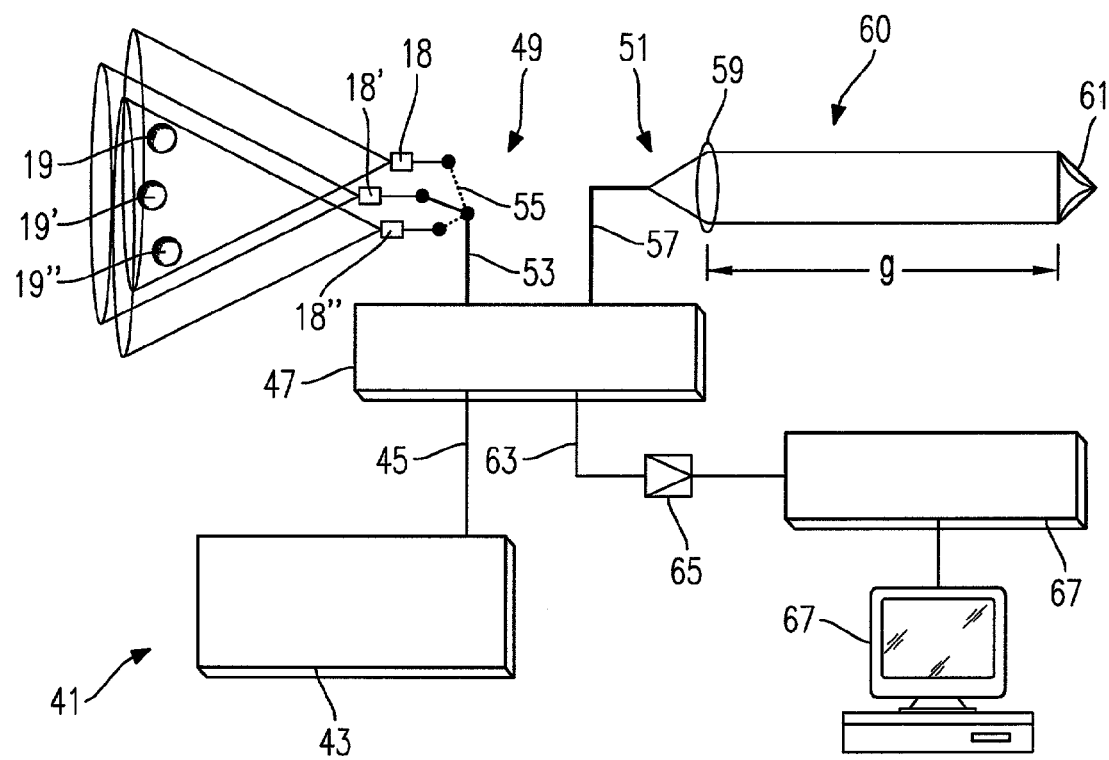

In FIG. 4 an interferometry system 41 for determining the distances d1, ..., d9 is represented schematically. This system includes a white light source 43, which may be formed by a super-luminescence diode, for example. In view of a higher radiation intensity it is preferred, however, to use a fiber light source therefor which is provided by an optically pumped light conducting fiber, which is doped, such that increased spontaneous emission takes place therein. Such a fiber light source can be purchased from AMS Technologies-Optotec Division, 82152 Martinsried/Munich under the product designation WLS-02. However, it is also possible to use as light source 43 a short pulse laser, such as a Femto second laser such as a titanium saphire laser. The light emitted from the source 43 is supplied to a fiber coupler 47 via a light conducting fiber 45 or optical fiber 45, which light coupler 47 supplies the light to a measuring branch 49 on the one hand and to a reference branch 51 on the other hand. The measuring branch 49 is supplied the light via a fiber conductor 53 from the fiber coupler 47, wherein the computer 67 provides a controllable optical changeover switch 55 switch supplying the light selectively to one of the emitter-receiver assemblies 18, 18', 18". The emitters 18, 18', 18" each emit their light into angular ranges, such that the emitted light impinges on the three reflectors 19, 19', 19" and is reflected therefrom back to the emitter-receiver assemblies. The light received by the latter, in turn, is sent to the fiber coupler via the light conductor 53.

In the reference branch 51 the light is supplied from the fiber coupler 47 through a light conductor 57 to a device 60 for providing a variable optical path length g. The device includes collimation optics 59 arranged in front of the end of the fiber 47, which optics direct the supplied light onto a mirror 61 arranged at a variable distance g from the collimation optics 59. The light reflected back from the mirror 61 is coupled into the light guiding fiber 47 by the optics 59 and is again supplied to the fiber coupler 47.

The fiber coupler superimposes the light supplied by the fibers 53 and 57 from the measuring branch 49 or reference branch 59, respectively, and issues it via a light conducting fiber 63 to a radiation sensor 65.

If an optical path length of the measuring branch 59 is in agreement with the optical path length of the reference branch 51, the radiation sensor 65 registers an increased radiation intensity. The optical path length of the measuring branch 59 is given by the optical path length between the fiber coupler 47 and one of the reflectors 19, 19', 19". The optical path length in the reference branch 51 is given by the optical path length between the fiber coupler 57 and the mirror 61.

In the measuring branch 49 mostly nine different optical path lengths are provided corresponding to the nine distances between the emitter-receiver assemblies 18, 18', 18" and the three refelctors 19, 19', 19". By conintuous variation of the length g across the available range, intensity increases can be detected nine times by the sensor 65. The calculator 67 can then detect from the length g, in which a corresponding increase of intensity takes place, the distance between a corresponding pair consisting of emitter-receiver assembly and retroreflector. Herein it is at first not entirely clear between which pair of emitter-receiver assembly and retroreflector this distance is realized. However, it is possible that additional data is available as additional information, such as a previously determined position and orientation of the assemblies 18 and reflectors 19. However, it is also possible to supply radiation to merely one of the emitter-receiver assemblies by activating the changeover switch 55 and/or by activating the LCD shutters 28 in the retroreflectors to activate merely one of those retroreflectors, so that an increase of intensity registered by the sensor 65 can be assigned to exactly one pair of emitter-receiver assemblies and reflectors. The changeover switch 55 as well as the LCD shutters 28 are controlled by the computer 67. The computer 67 also controls a drive for the variation of the length g in the reference branch 51, for which reason all the information is accessible to the computer 67 for detecting the distances d1, ..., d9. From the latter, in accordance with the method explained above in connection with FIG. 16, the computer then determines the position and orientation of the emitter-receiver assemblies 18 and reflectors 19 relative to each other.

Subsequently, alternatives of the interferometric system explained in connection with FIG. 4 are represented. Herein, components having corresponding function bear numerals of FIGS. 1 to 4, however, they are distinguished by an additional letter. For the explanation, reference is made to the entire preceding description.

Figure 6:
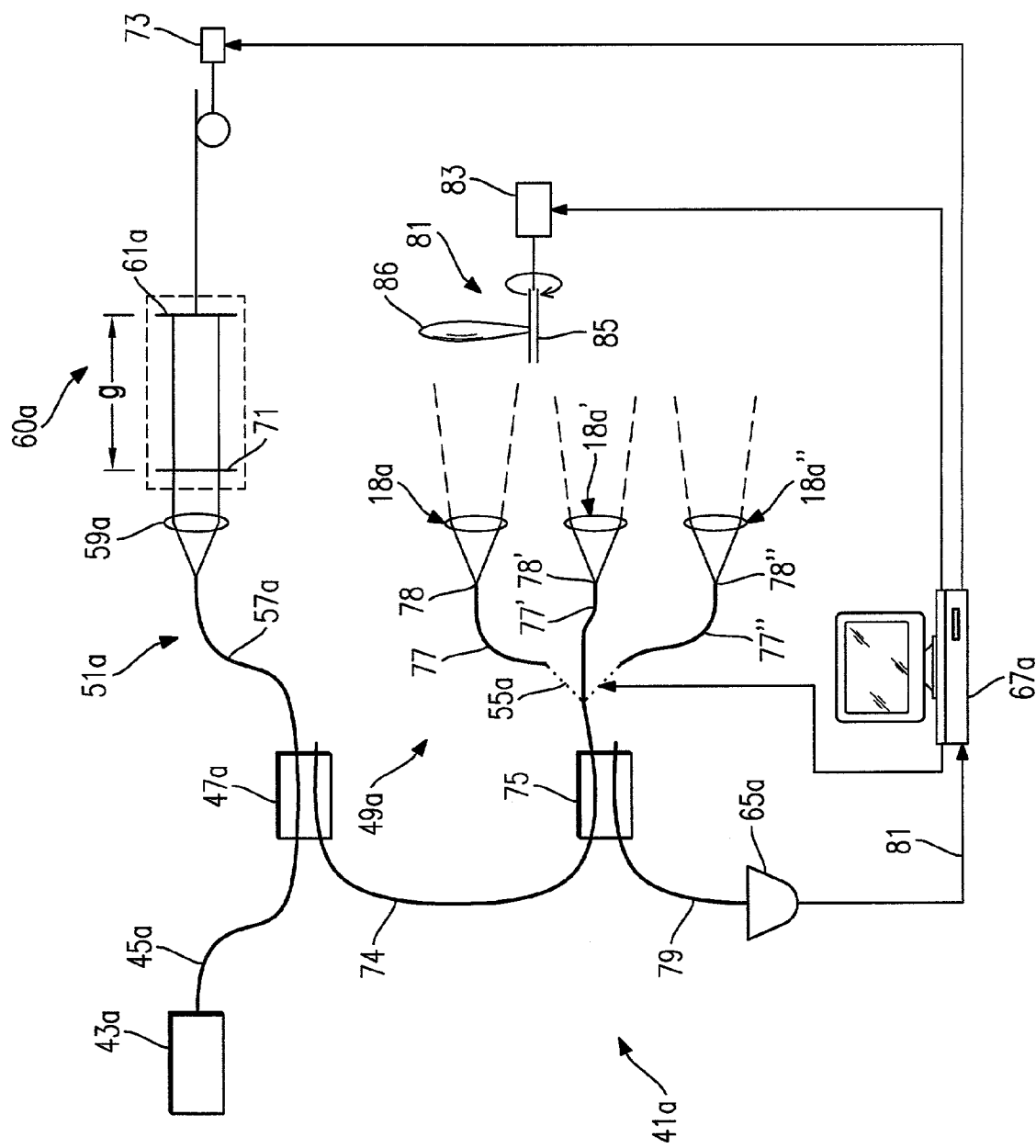
FIG. 6 a schematic representation of a structure of an interferometry arrangement as it can be used in the system according to FIG. 3, FIG. 7 a variation of the interferometry arrangement shown in FIG. 6, FIG. 8 a further variation of the interferometry arrangement shown in FIG. 6, FIG. 9 a radiation intensity course as it occurs in an interferometry arrangement according to FIG. 4, 6, 7 or 8, FIG. 10 an embodiment of a light guiding arrangement as it is applicable in interferometric arrangements of FIGS. 4, 6, 7 and 8, FIG. 11 a top view of an embodiment of a device for providing a variable optical path length, FIG. 12 a partial side view representation of the device shown in FIG. 11, FIG. 13 a schematic perspective representation of a further embodiment of a device for providing a variable optical path length, FIG. 14 a supplementary schematic representation of the device shown in FIG. 13, FIG. 15 a variation of the arrangement shown in FIG. 1 in which several machine tools are provided, and FIG. 16 a flow chart for explaining an embodiment of a method for determining the position or orientation of two objects relative to each other.

An interferometric system 41 represented in FIG. 6 includes a white light source 43a, whose radiation is supplied by a light conductor 46a to a fiber coupler 47a, which supplies the radiation to a reference branch 51a via a light conductor 57a. In the reference branch 51a, a device 60a is arranged for providing a variable optical path length.

The device 60a includes collimation optics 59a which directs the radiation exiting at the end of fiber 57a through a semi-transparent plate 71 onto a mirror 61a through which the radiation is reflected back into fiber 57a, and the mirror 61a is variable by a drive 73 controlled by a computer 67a. However, the radiation emitted from the end of fiber 57a is split into two partial beams by the semi-transparent mirror 71a. That is a first partial beam which is reflected directly from the semi-transparent mirror 71a back to fiber 57a. The second partial beam penetrates the semi-transparent mirror 71a and, different from the first partial mirror, passes through an additional path length of twice g, before the second partial beam is coupled into fiber 57a after reflection at the mirror 61a. Thus, radiation returning in fiber 57a to fiber coupler 47a comprises a coherence structure such that wave trains arranged at a distance 2·g from each other are coherent to each other.

The fiber coupler 47a guides the radiation returning from reference branch 51a to a measuring branch 49a via a light conductor 74 and a further fiber coupler 75. After fiber coupler 75 a changeover switch 55a is provided in reference branch 49a, in order to supply the radiation by light conductors 77 to emitter-receiver assemblies 18, 18', 18" which emit the radiation towards retroreflectors not represented in FIG. 6. The radiation reflected back from the retroreflectors is coupled into the emitter-receiver assemblies 18a in turn and supplied via fiber coupler 75 and a light conducting fiber 79 to a radiation sensor 65a, whose measuring signal is provided to the computer 67a via a line 81.

Thus, in the measuring branch 49a the radiation reflected back from the retroreflectors travels to fiber coupler 75 and impinges on detector 65a. In addition to the radiation reflected back from the retroreflectors, another portion of radiation comes into existence which travels towards the detector 65a, which portion of radiation is generated by a reflection at ends 78, 78', 78" of fibers 77, 77' or 77", respectively. Thus, between a partial beam generated in the measuring branch 49a by reflection at fiber end 78 and a further partial beam generated by reflection at the retroreflector, a fixed coherence relationship comes into existence, similar to the manner already described for the two partial beams in connection with the device 60a. If now the optical path length between the fiber end 78 and the retroreflector and back is equal to the path length 2·g, as it is provided by the device 60a, the radiation sensor 65a registers an intensity maximum. Through the latter, the distance between the corresponding fiber end 78 or the emitter-receiver assembly 18a, respectively, is determinable directly.

FIG. 6 also shows a changeover switch 55a controlled by a calculator 67a, in order to supply the radiation selectively to one of the emitter-receiver assemblies 18a, 18a' and 18a". Alternatively, however, it is also possible to provide a chopper wheel 81 in the beam path between the emitter-receiver assemblies and the retroreflectors, the chopper wheel being arranged rotatable about an axis 85 by a motor 83 controlled by computer 67a, such that a wing 86 of the chopper wheel 81 selectively interrupts the radiation emitted by the emitter-receiver assembly 18a or the emitter-receiver assembly 18a'.

Figure 7:
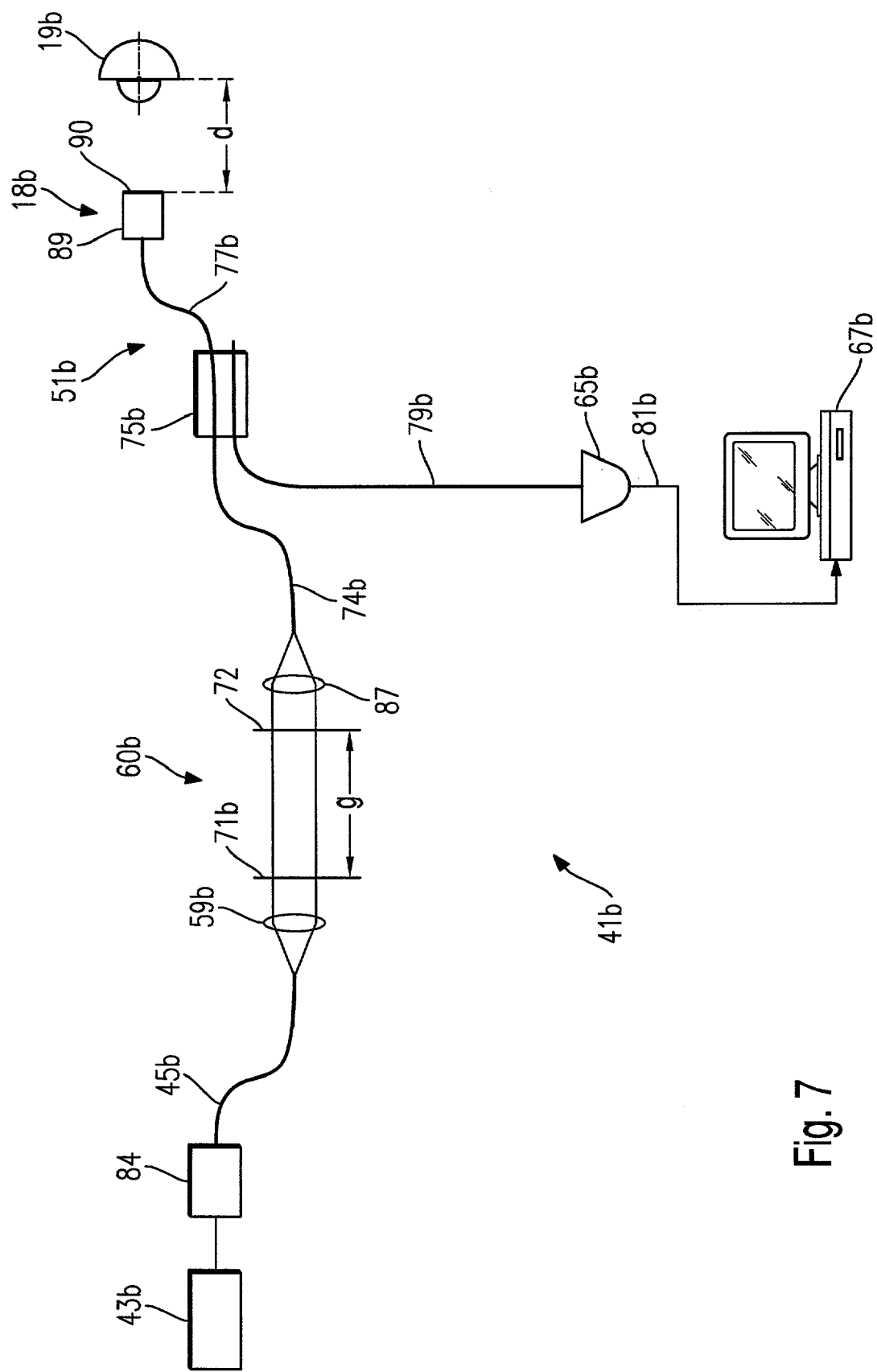

An interferometric system 41b represented in FIG. 7, as it is shown, together with the arrangement of an emitter-receiver assembly 18 shown in FIG. 2 and three retroreflectors is suited to determine the position of two objects relative to each other, wherein in FIG. 7 merely a retroreflector is represented. However, it is simply possible to modify the interferometric system 41 in a way that it comprises three emitter-receiver assemblies and is also suited for the determination of the relative orientation of two objects, as this is shown in FIG. 3.

The interferometric system 41b comprises a white light source 43b, wherein it supplies its radiation to the remaining system via an optical isolator 84, in order to protect source 43b from radiation retroreflected through the system back to the source.

Via a glass fiber 45b and collimation optics 59b the radiation emitted from the source 43b is supplied to a device 60b for providing a variable optical path length, which—different from the device represented in FIG. 6—does not operate in reflection but in transmission. For this, the device 60b includes two semi-transparent mirrors 71b and 72, whose distance g from each other is variable by a motor. Through the two mirrors 71a and 72 the radiation is split in two partial beams, namely a partial beam which directly penetrates the two mirrors 71a and 72 and is coupled into a light conductor 74b by another optical system 87, which guides the radiation to a measuring branch 51b. A second partial beam penetrates at first mirror 71b, is reflected at mirror 72, travels back to mirror 71b, is again reflected by it, then passes through mirror 72 and is coupled into fiber 74b via the optical system 87. Different from the first partial beam, the second partial beam has a delay which corresponds to the optical path length 2·g.

The further structure of the interferometric system 41b shown in FIG. 7 is largely similar to the interferometric system shown in FIG. 6, namely the two partial beams are supplied via a fiber coupler 57b and a light conducting fiber 77b to an emitter-receiver assembly 18b, from which they are emitted to the reflectors 19b. Radiation reflected back from the reflectors 19b is again coupled into the fiber 77b and supplied to a radiation sensor 65b via a light conductor 79b.

The emitter-receiver assembly 18b further comprises a GRIN lens coupled to the end of the fiber 77b, in order to emit the radiation in the necessary angular range. An exit surface 90 of the lens 89 is partly mirrored, in order to generate a retroreflex which is guided back directly to the sensor 65b. The sensor 65b then detects an increased intensity signal, when the length g between the mirror 71b, 72 of the device 60b substantially coincides with the distance d between the reflectors 19b.

Figure 9:
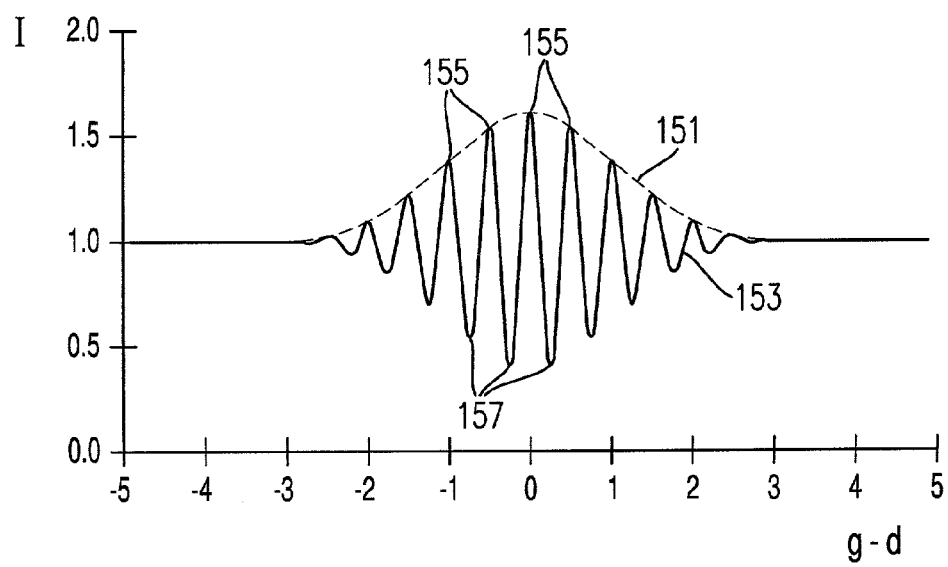

FIG. 9 shows the course 153 of a measuring signal I, as it is issued by the radiation sensor 65b in dependence on the distance g of the mirrors 71b and 72 from each other, there being assumed that the distance d between reflector sphere 19b and emitter-receiver assembly 18b is constant. If the distances d and g are identical (g−d=0), there results a maximum interference signal I. On both sides of this maximum at g−d=0, the measuring signal decreases oscillatingly.

In order to measure the distance d accurately, the distance g must now be detected, at which the interference signal is at its maximum. For one, this can be carried out in that the envelope 151 drawn in a dashed line in FIG. 9 which envelopes the measuring signal 153 is evaluated and that the maximum of the envelope 151 is detected. This method is sufficient most of the time, in order to be able to measure the distance d with sufficient accuracy.

A more exact method, but requiring more calculation effort, provides to localize several maximums 155 and minimums 157 of the measuring curve 153, in order to find therefrom the zero point of the horizontal axis in FIG. 9, i.e. the exact position of the intensity maximum. This is possible, for example, if the zero point is detected as mean value from the two lowest minimums 157 and the three highest maximums 155. Other evaluation techniques for finding the zero point in the course 153 are possible as well.

Figure 8:
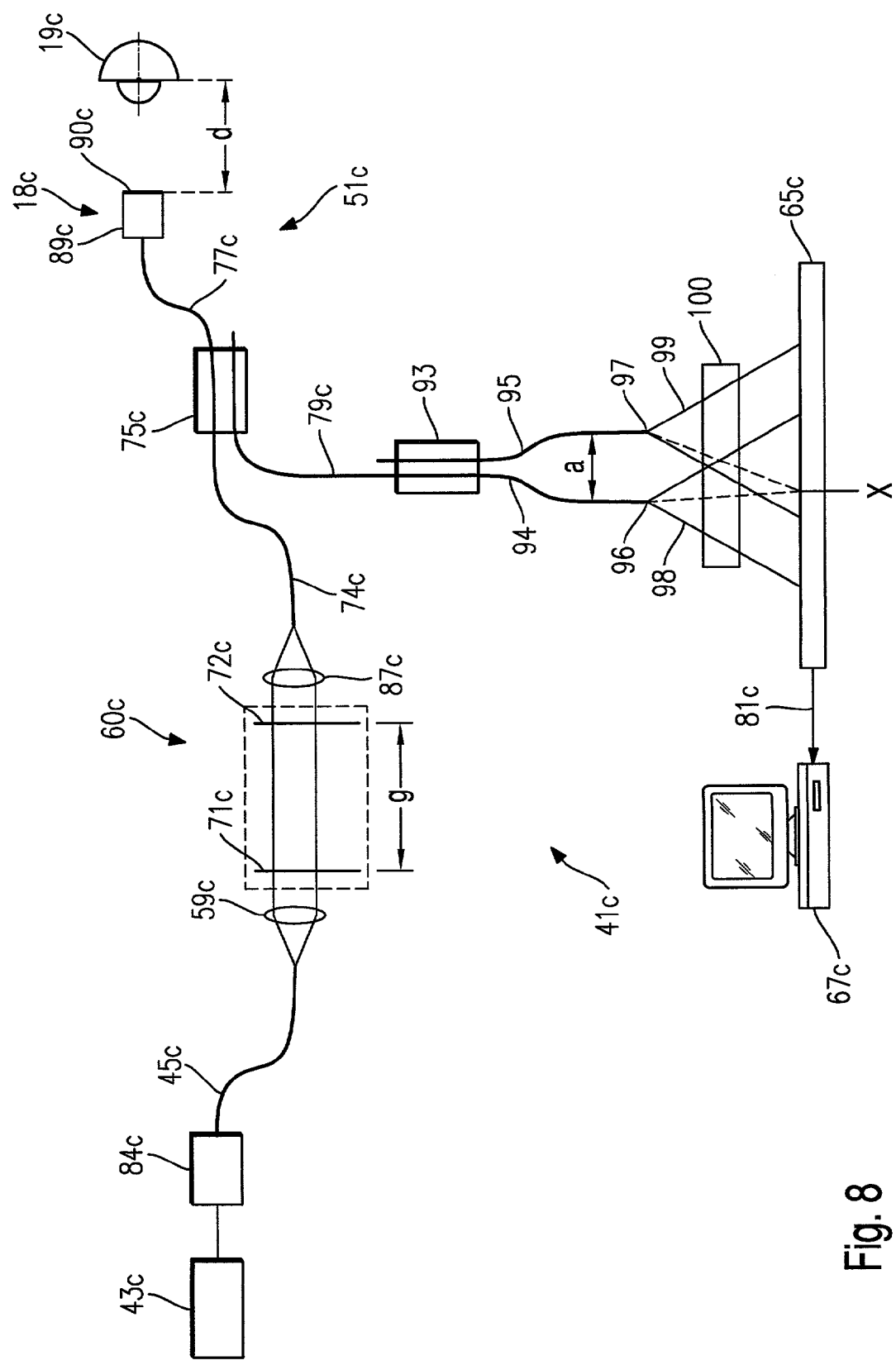

An interferometric system 41c represented in FIG. 8 comprises substantially the same structure as the interferometric system shown in FIG. 7. Different therefrom, radiation returning from a measuring branch 51c, however, is not directly supplied to a photosensor 65c via a radiation part 75c and a light conducting fiber 79c connected thereto. Rather, the radiation traveling in the light conducting fiber 79c in the direction towards the detector 65c is split by a further beam splitter 93 to two light conducting fibers 94 and 95, whose fiber ends 96 and 97 are arranged at a predetermined distance a from each other and emit radiation they contained in them to the photodetector 65c, which is formed here as a location-resolving line detector and is arranged at a distance from the fiber ends 96, 97. From the fiber ends 96 and 97 the radiation is emitted as spherical wave in a cone 98 and 99 toward the line detector 65, wherein between the fiber ends 96 and 97, respectively, and the detector 65c a cylinder lens 100 is arranged oriented parallel to the line direction of the detector 65c, in order to focus the radiation on the detector in a direction transverse to the line direction of the detector.

Via the data line 81c the computer 76c detects those locations at which intensity maximums or intensity minimums, resp., come into existence on the line detector 65c.

If the length g of the device 60c for providing the variable optical path length and the distance d between the emitter-receiver assembly 18c and the retroreflector 19c are exactly equal, there comes into existence on the detector 65c an intensity maximum at a location which, in the case of identical length of the two fibers 94 and 95, is arranged symmetrically to the two fiber ends 96 and 97. If, however, there is a slight difference between the length g and the distance d, the corresponding intensity maximum is displaced from the location arranged symmetrically with respect to the fiber ends 96, 97, as this is represented schematically by location X in FIG. 8. The magnitude of the displacement away from the symmetrical location continues to remain dependent on the distance a of the two fiber ends 96, 97 from each other and is the greater, the smaller the distance between the fiber ends 96, 97.

If the three retroreflectors 19c are arranged at different distances d from the emitter-receiver assembly 18c, several intensity maximums arranged adjacent to each other come into existence on the line detector, which can be detected simultaneously by the computer 67c. Thus, the computer 67c is able to detect simultaneously the several distances d of the reflectors of the assembly 18 without changing the distance g and thus without activating the drive of the device 60c for providing the variable optical path length.

There can also be provided a device for mounting the fiber ends 96, 97 not shown in FIG. 8, in which the distance a from the computer 67c is variable by motor control. If the different distances d comprise small differences from each other, a small distance a is adjusted, in order to increase the resolution of the distance measurement. If the different distances d differ from each other by greater values, so that the corresponding intensity maximums in the case of the smaller distance a do not come into existence on the detector 65c simultaneously, the distance a is increased, in order to be able to detect the distances simultaneously, at reduced resolution.

As apparent from FIG. 1, the computer 67 and a majority of the components of the interferometry system 41 is arranged beside the machine tool 1. Merely a part of the interferometry system 41, namely its measuring branch, is arranged on the machine tool 1, in order to supply the measuring radiation to the emitter-receiver assembly 18. For this the light conducting fiber 53 enters the base 7 of the machine tool 1, the base being fixedly connected with the floor. From there the radiation is then guided through the movable arm 9 also by means of light conductors as far as the emitter-receiver assembly 18. Herein the problem arises that in the case of beam guidance in the displaced arm 9 by means of a conventional one-mode light conductor, displacements of the light conductor bring about changes of its birefringent properties, which in dependence on polarization again bring about changes in the optical path length in the light conductor. Since in such situations in such light conductors there also occur variations of the polarization condition of the light guided therein, such phase differences can occur when passing through the light conductor in the direction toward the emitter and back from the receiver, i.e. phase differences between the two directions of polarization, that the light of one condition of polarization and the light from the other condition of polarization can even cancel each other interfere in the later processing of the radiation in the interferometry system. Therefore it is provided to guide the radiation in the displaced part of the machine tool 1 not in a conventional one-mode conductor but to use a polarization-maintaining light conductor for that purpose.

Figure 10:
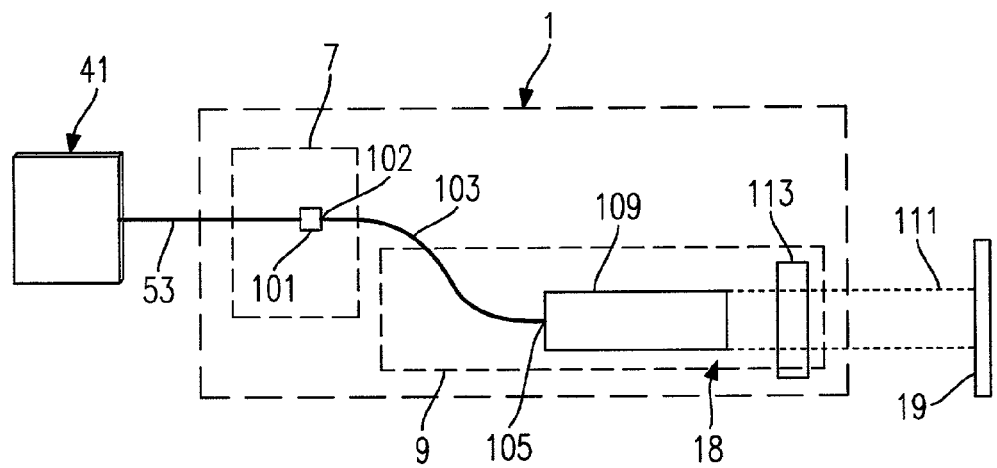

This is shown schematically in FIG. 10. The box 1 represented in dashed lines in FIG. 1 symbolizes the machine tool 1 as a whole, i.e. including its parts which are displaced as compared to the remaining components of the interferometry system 41, and the box 7 represented in dashed lines symbolizes the base of the machine tool 1, which base rests as compared to the remaining parts of the interferometry system. The radiation is supplied to the resting base 7 via light conductor 53. A fiber coupler 101 is provided in the base 7 fixedly connected therewith, which couples radiation supplied via light conductor into a polarization-maintaining fiber 103 at its one end 102. Then, fiber 103 supplies the radiation in the displaced arm 9 of the emitter-receiver assembly fixedly connected with a part of the displaced arm 9, which assembly is coupled to the object-side end 105 of the fiber 103.

The assembly 18 includes collimation optics 109 for forming an emitted beam 111. In front of the collimation optics 109, a quarter-wave plate 113 is arranged through which the beam 111 passes after leaving the optics 109. The beam 111 is reflected at the reflector 19, passes through the quarter-wave plate 113 again and is again coupled into the polarization-maintaining fiber 103 via the collimation optics. The radiation reflected back from the reflector 9 passes through the conductor 103, is coupled into the fiber 53 at the interface 101 and reaches the remaining components of the interferometry system 41 for further processing.

When entering the polarization-maintaining fiber 103 at its fiber end 102, unpolarized light supplied by fiber 53 is split into its two directions of polarization which are transported by fiber 103 in separate polarization channels as far as the other fiber end 105. Herein a cross-talk from one polarization channel to the other does not occur substantially. A radiation component transported by the first of the two polarization channels through fiber 103 experiences a complete polarization rotation due to passing through the quarter-wave plate 113 twice, so that on its return path through fiber 103 it passes through its other polarization channel. Vice versa, the second polarization component of the incoming light passes through the second polarization component on its way there first and then the first polarization channel when returning.

Both polarization components of the re-polarized radiation supplied via the light conductor 53 thus pass through the one and then the other polarization channel one after the other. Even if the two polarization channels each provide different optical path lengths in the polarization-maintaining light conductor 103, all in all, however, they still pass through both of the substantially identical entire optical path through the light conductor 103. Therefore, also substantially no phase differences come into existence between the two polarization components, and the previously described signal cancellation due to such phase differences does not occur when using the polarization-maintaining fiber 103 in the moved parts of the tool machine 1.

The previously described concept of using the polarization-maintaining fiber in connection with a distance sensor in a situation, where the two fiber ends 102 and 105 are displaced relative to each other, is not restricted to the distance sensor. It can also be used in other sensor types, in which light is supplied to a sensor head via a light conductor as well as returned from the latter for further evaluation. This can be a sensor of the general type in which the returned radiation enters reciprocation with any suitable medium, a surface or a sample volume, experiences a change in the radiation properties which are then analyzed after return of the radiation through the same light conductor. This can be a pressure sensor, a tension sensor, a temperature sensor, a sensor for electric or magnetic fields or a sensor which detects the presence of chemicals or the like.

Further, this concept is also applicable on supply and discharge means of beams in which the radiation supplying light conductor 103 or the radiation discharging light conductor 103, respectively, is not merely subjected to displacements. There are also other environmental influences which lead to signal disturbances in the conventional one-mode fiber. These are, for example, pressure, temperature, strong electric or magnetic fields, chemical influences and the like. The polarization-maintaining fiber 103 is largely stable in view of such environmental influences. Thus, this concept can also be used when an optical sensor is used, wherein the radiation supplying and the radiation discharging light conductor, respectively, penetrates an ambiance which would influence the signal transmission due to influences such as temperature, pressure or the like.

Figure 11:
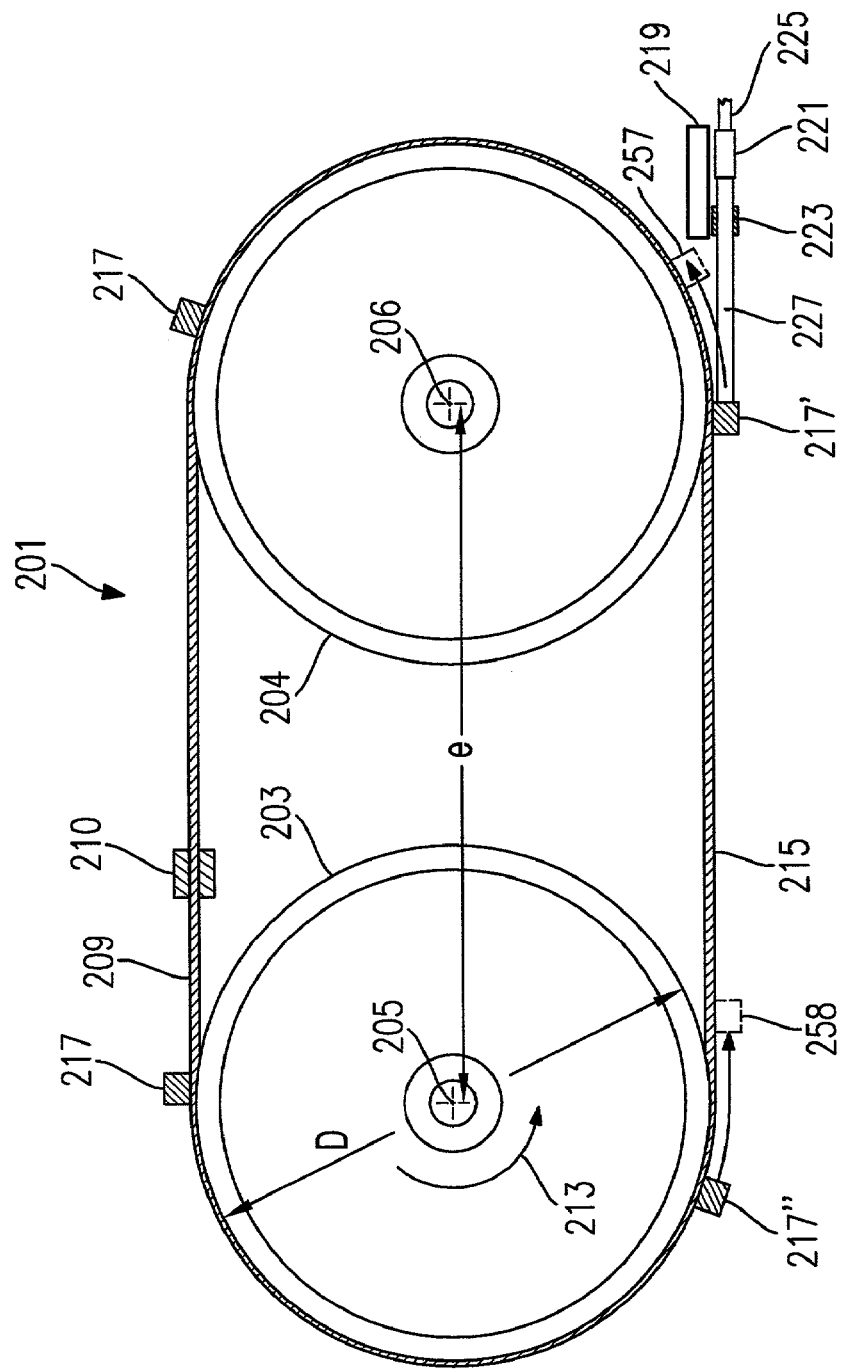
Figure 12:
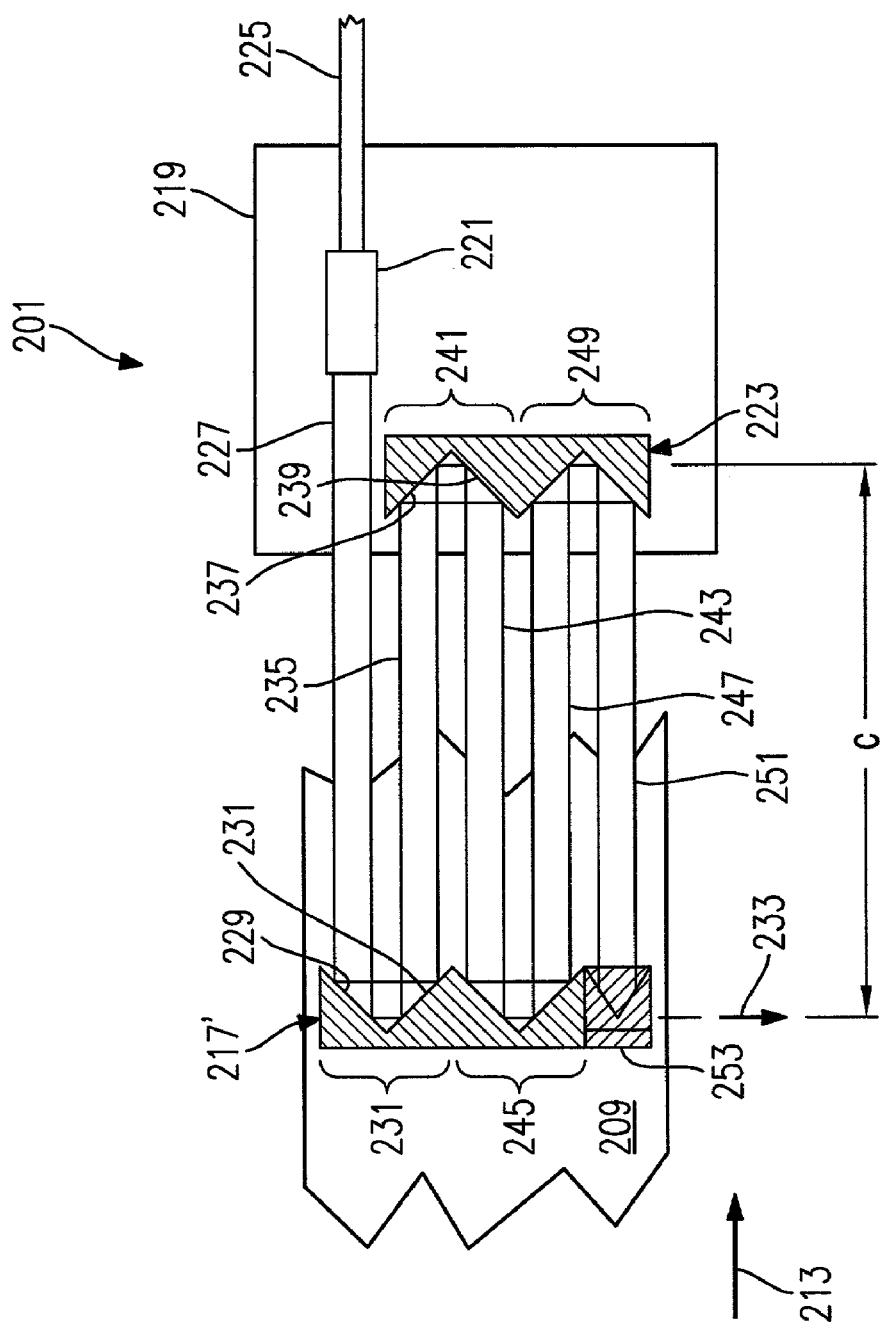

FIG. 11 shows a top view of a device for providing a variable optical path length or for providing a variable optical delay, respectively, in form of a belt scanner 201. FIG. 12 shows a partial side view of the belt scanner 201. The belt scanner 201 includes two belt pulleys 203 and 204 each having equal diameter D and centers of rotation 205 or 206, resp., arranged parallel to each other and at a distance e from each other. The upper faces of the two pulleys 203, 204 lie in a common plane, and a ring belt 209 is led about the circumferential surfaces of the two disks or pulleys. The length of the ring belt 209 and the distance e of the two centers of rotation 205 and 206 are coordinated in a way that the belt 209 in its circumferential direction is under mechanical tension and thus lies firmly against the circumferential surfaces of the pulleys 203, 204. The pulley 203 is drivable in a direction 213 about its center of rotation 205 by a motor not shown in FIG. 11, such as a motor, so that also the belt 209 and the other pulley 204 are driven in the same direction.

Another working range 215 of the belt scanner 201 is formed in the area of the belt in which the latter extends in a straight line from pulley 203 to pulley 204 in the direction 213. In this range the belt extends along a tangent which is common to the circumferential surfaces of the pulleys 203 and 204.

Four mirror arrangements 217 are fixed on the belt 209, which are arranged in the direction of circumference of the belt 209 each at equal distance from the other. In the representation in FIG. 11 a mirror arrangement designated with 217' is arranged in the working range 215. Apart from this mirror arrangement 217' there are no further mirror arrangements 217 in the working range.

Beside the belt pulley 204, a mounting 219 is arranged fixed with respect to the centers of rotation 205, 206 and bears a beam guiding device 221 as well as a mirror arrangement 223.

A light conductor 225 supplies the radiation from a light source to the beam guiding device 221. The beam guiding device 221 contains collimation optics not shown in FIGS. 11, 12, in order to emit a parallelized light beam 227 parallel to the direction of the belt 209 in the working range 215 such that it impinges on the mirror arrangement 217' arranged in the working range 215. At the mirror arrangement 217' the beam 227 first impinges on the mirror 229 arranged under 45° toward the direction of the beam 227, which mirror 229 deflects the beam 227 by 90° and guides it to a further mirror which with mirror 229 includes a 90° angle. The two mirrors 229 and 231 act as a reflector 233 which retroreflects the beam 227 parallel to its original beam direction, however offsets it in a direction 233 parallel therewith, such that the beam impinges on the mirror arrangement 223 fixedly arranged with respect to the beam guiding device 221. The direction 233 is oriented orthogonal with respect to the direction of movement 213 of the belt 209 in the working range 215 and parallel with respect to the upper surface of the belt 209 in the working range 215.

The beam 235 first impinges on a reflector 241 formed by two mirror surfaces 237 and 239, the reflector reflecting the beam 235 further back in the direction 233 offset with respect to the mirror arrangement 217', where by a further reflector 245 including also two mirror surfaces arranged under 90° with respect to each other, as beam 247 reflected back again in the direction toward the mirror arrangement 223. There the beam 247 impinges on a further reflector 249 formed by two mirror surfaces, which again offsets and deflects the beam parallel, and guides it as beam 251 in the direction toward the reflector arrangement 217'. There the beam 251 impinges on a retroreflector 253 which is constructed of three pairs of mirror, each pair of mirror surfaces being orthogonal to each other, thus, retroreflecting the beam 251 accurately within itself. The beam retroreflected in itself by retroreflector 253 then impinges on the reflectors 249, 245, 241 and 231 in succession, whereupon it is again coupled into the collimation optics of the beam guiding device 221.

Due to the multiple reflection back and forth between the mirror arrangement mounted on the belt 209 and the fixedly arranged mirror arrangement 223, the beam travels between its emission by the beam guiding device 221 and its reentry into the same an optical path, which corresponds to somewhat more than the tenfold distance c at which the two mirror arrangements 217' and 223 are arranged from each other.

If the mirror arrangement moves in 217' from the beginning of the working range 215 to its end, the optical path length of the beam changes between its exit from or its entry into the beam guiding device 221 by a value which corresponds to the tenfold length of the working range 215.

The maximum lift, i.e. the maximum variation of the optical path length, of the belt scanner 201 accordingly has a value corresponding to ten times the distance e of the two axes 205 and 206 from each other.

If the mirror arrangement 217' is arranged in the working range 215, the mirror arrangement 217", which reaches the working range 215 next when the belt 209 is moved in direction 213, has such a distance that the mirror arrangement 217" is arranged exactly in the working range when the preceding mirror arrangement 217' has just left it. Such a situation is represented in FIG. 11 in a dashed line, wherein the mirror arrangement 217', as it has just left the working range 215, is designated with the reference numeral 257 and the mirror arrangement 217" immediately after its entry into the working range 215 is designated with the reference numeral 258.

When displacing the mirror arrangement 217' in the direction 213, it moves along a circular path about the pulley 204 after leaving the working range 215. This means that during a certain period of time the mirror arrangement 217' has left the working range 215, but that it still shadows the beam 227 geometrically, so that the beam guidance in the optical scanner 201 is interrupted. During this time the optical scanner 201 cannot provide any optical path length. This is a dead time in a way which renders the duty factor of the device 201 smaller than 1. This dead time, however, can be used to set back an electronic device, which evaluates the delayed optical signal, or to carry out other switching operations.

As soon as the mirror arrangement 217' has then been moved far enough around the circumferential surface of the disk 204, the mirror arrangement 217' releases the beam 227 again, so that it impinges on the mirror arrangement 217" trailing mirror arrangement 217' and is reflected back from the latter exactly as this has been described already for the mirror arrangement 217'.

In order to be able to use the entire deviation available due to the dead time on account of the shadowing, i.e. to be able to use the maximum variable optical path length, the distance between the mirror arrangements 217 succeeding one another in the circumferential direction of the belt 209 is adjusted to be somewhat greater than the available deviation. This is carried out in the case of the belt scanners 201 represented in FIGS. 11 and 12 in that the diameter D of the belt pulleys 203, 204 is selected to be 165 mm and the ratio of the axial distances e to the disk diameter e/D is selected to be 1.34.

The belt 209 in the described embodiment is a steel band of Invar steel, i.e. a steel having a lesser thermal coefficient of expansion. Further, at the scanner 201 at least one guiding device is still provided designated with 210, which guides the belt at least in axial direction of the pulleys 203, 204, so that it moves in a stable position about the pulleys 203, 204. The drive drives the belt pulleys 203 at such a speed that the belt moves in the direction of circumference at a speed of 10 meters per second.

Figure 13:
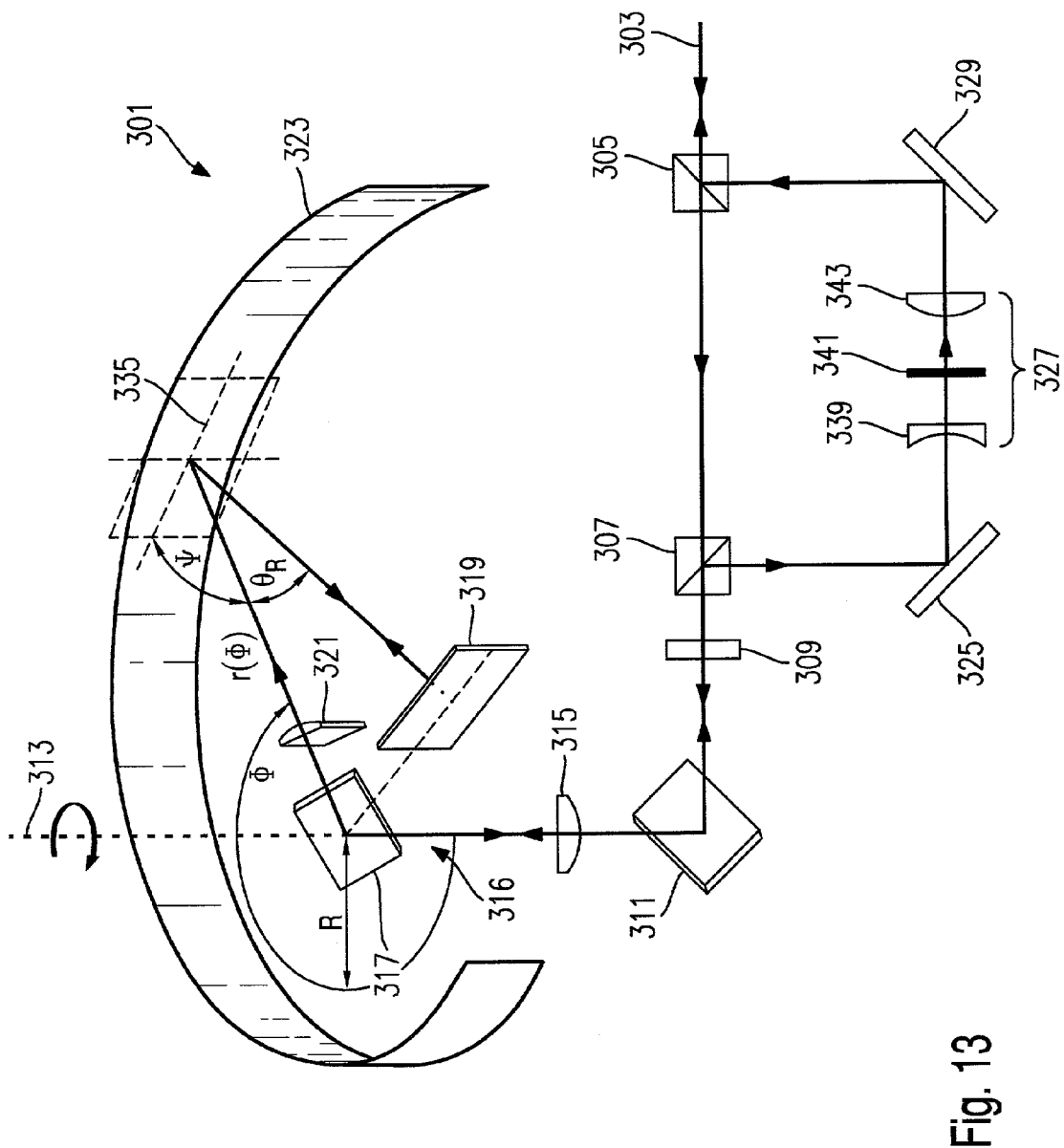
Figure 14:
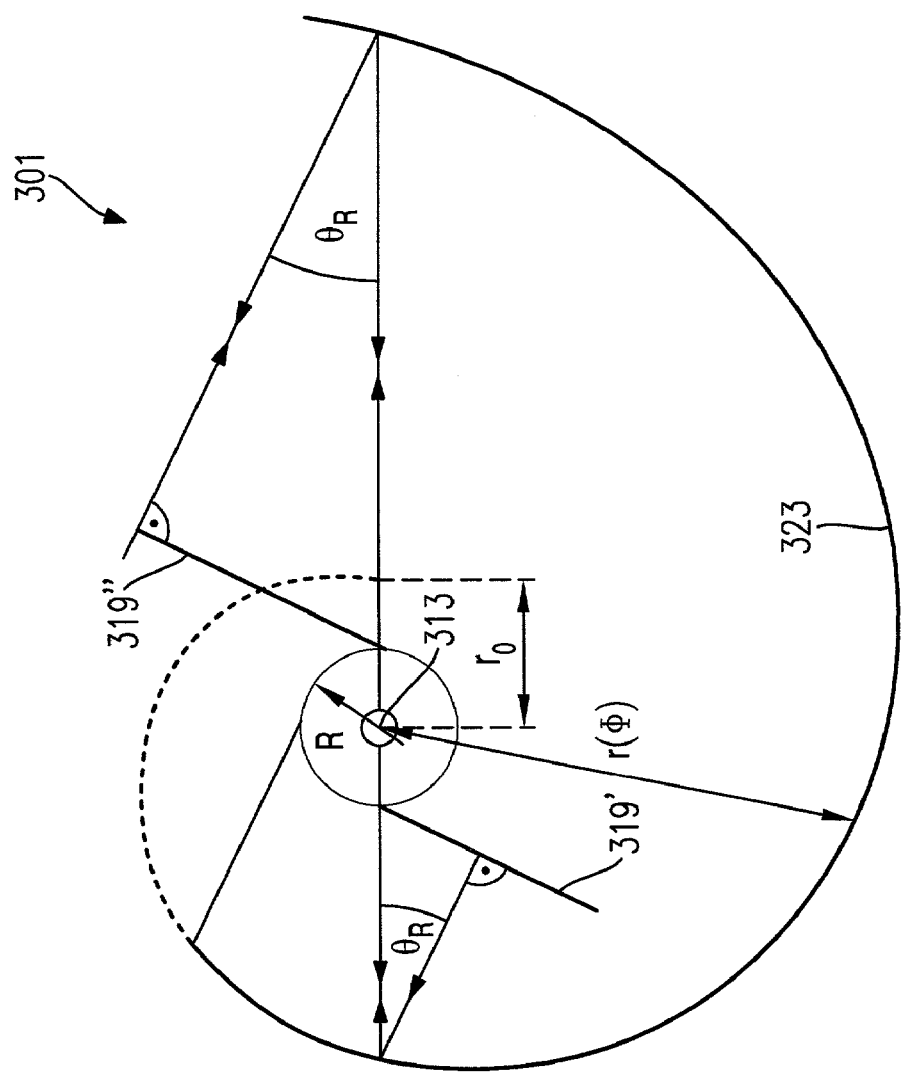

In the FIGS. 13 and 14 a variation for a device for providing a variable optical path length is shown which is designed as a spiral scanner 301.

The spiral scanner 301 is supplied a light beam 303, which at first passes through a first polarizing beam splitter 305 and then through a second polarizing beam splitter 307 each in a straight line. After passing through a quarter-wave plate 309 the beam impinges on a mirror 311 fixedly arranged with respect to the two beam splitters, which mirror 311 deflects the beam by approximately 90°, so that it extends parallel to a center of rotation 313. After reflection at the mirror 311, the beam passes through a collimation lens 315 which forms the beam such that it continues on the center of rotation 313 and in FIG. 13 in the upward direction.

The spiral scanner 301 further includes an assembly 316 which is constructed of the following components having a fixed spatial relationship with each other, namely a deflection mirror 317, a plane mirror 319 and a cylinder lens 321. The assembly 316 is arranged to be rotatable about axis 313, wherein it is made to rotate by a drive not shown in FIGS. 13 and 14.

The spiral scanner 301 further includes a spiral mirror 323, whose mirror surface extends spirally about the center of rotation 313.

The deflection mirror 317 of the rotating assembly 318 is arranged on a center of rotation 313 such that it deflects the beam leaving the collimation lens 315 by 90° and onto the reflection surface of the spiral mirror 323, wherein the beam passes through the cylinder lens 321 between deflection at the deflection mirror 317 and impinging on the spiral mirror 323. After impinging on the spiral mirror 323, the beam is reflected towards the plane mirror 319 of the rotating assembly 316, which is always aligned orthogonal to the beam impinging on it, so that it throws the beam in itself back to the spiral mirror 323. From the latter the beam is then reflected back to the deflection mirror 317 after renewed passing through the cylinder lens 321, the deflection mirror orienting the beam on the center of rotation 313 extending downward. The returning beam then penetrates the collimation lens 315, is deflected by mirror 311, passes through the quarter-wave plate 309 and is then deflected by 90° by the polarizing beam splitter 307, impinges on a further 90° deflection mirror 325, penetrates a beam forming assembly 327, is supplied by a further 90° deflection mirror 329 to the polarizing beam splitter 305, which then aligns the returning beam such that it extends substantially co-linear to the incoming beam 303.

Depending on the position of rotation of the assembly 316, the spiral scanner 301 provides a different optical path length. This is explained again in FIG. 14: It shows two positions of rotation of the rotating assembly, wherein the plane mirror 310 is designated with 319' in the one position of rotation and with 319" in the other position of rotation.

The shape of the spiral mirror 323 was selected to be a logarithmic spiral, so that in dependence on a circumferential angle φ the distance of the mirror surface from the center of rotation 313 the following equation suffices:

$$r(\phi) = r0\, exp\,(\phi \cot \psi),$$

wherein r0 is the smallest available distance between mirror surface 323 and axis 313.

Herein cot ψ is constant, so that also the angle ψ is constant. The angle ψ is represented in FIG. 13 and describes the angle between the beam impinging on the spiral mirror 323 and a tangent 335 at the spiral of the mirror 323.

Since the angle ψ is independent of the position of rotation of the assembly 316 about the center of rotation 313, the beam always impinges on the surface of the spiral mirror 323 under the same angle and thus is always deflected by the same angle.

The angle between the beam impinging on the spiral mirror 323 and the beam reflected back from it is termed θR and is also independent of the position of rotation. This means further that the beam reflected from the spiral mirror 323 impinges on the plane mirror 319 always also independent of the position of rotation under the same angle of 90°, since the plane mirror 319 is aligned such that the beam impinging on it is reflected in itself. Through the selection of the mirror shape as spiral mirror there is thus guaranteed that the beam entering the scanner 301 is retroreflected substantially in itself.

Since the beam impinging on the spiral mirror 323 has a certain expansion transverse to its beam direction and the surface of the spiral mirror 323 is not oriented orthogonal to this beam direction, the beam experiences between entering and exiting the spiral scanner 301 an optical path length which is not exactly constant across the entire beam cross section. This is also the reason why the beam forming assembly 327 is provided, in order to limit effects resulting therefrom. The beam forming assembly 327 includes a dispersing lens 339, an aperture plate 341 and a focussing lens 343.

The rotating assembly 316 is balanced dynamically, so that it runs smoothly and precisely even if the rotational speeds are high and there are rapid variations in the optical path length.

The previously described devices 201 and 301 for providing a variable optical path length are usable in any and all applications where the variable optical path length or an adjustable optical delay, respectively, are to be provided. Especially, the use in an interferometric device and further preferred in a white light interferometer is possible. Preferably, the devices 201 and 203 are used in the system also to detect the position or/and orientation of two objects, as it is explained above in connection with FIGS. 1 to 10.

Figure 15:
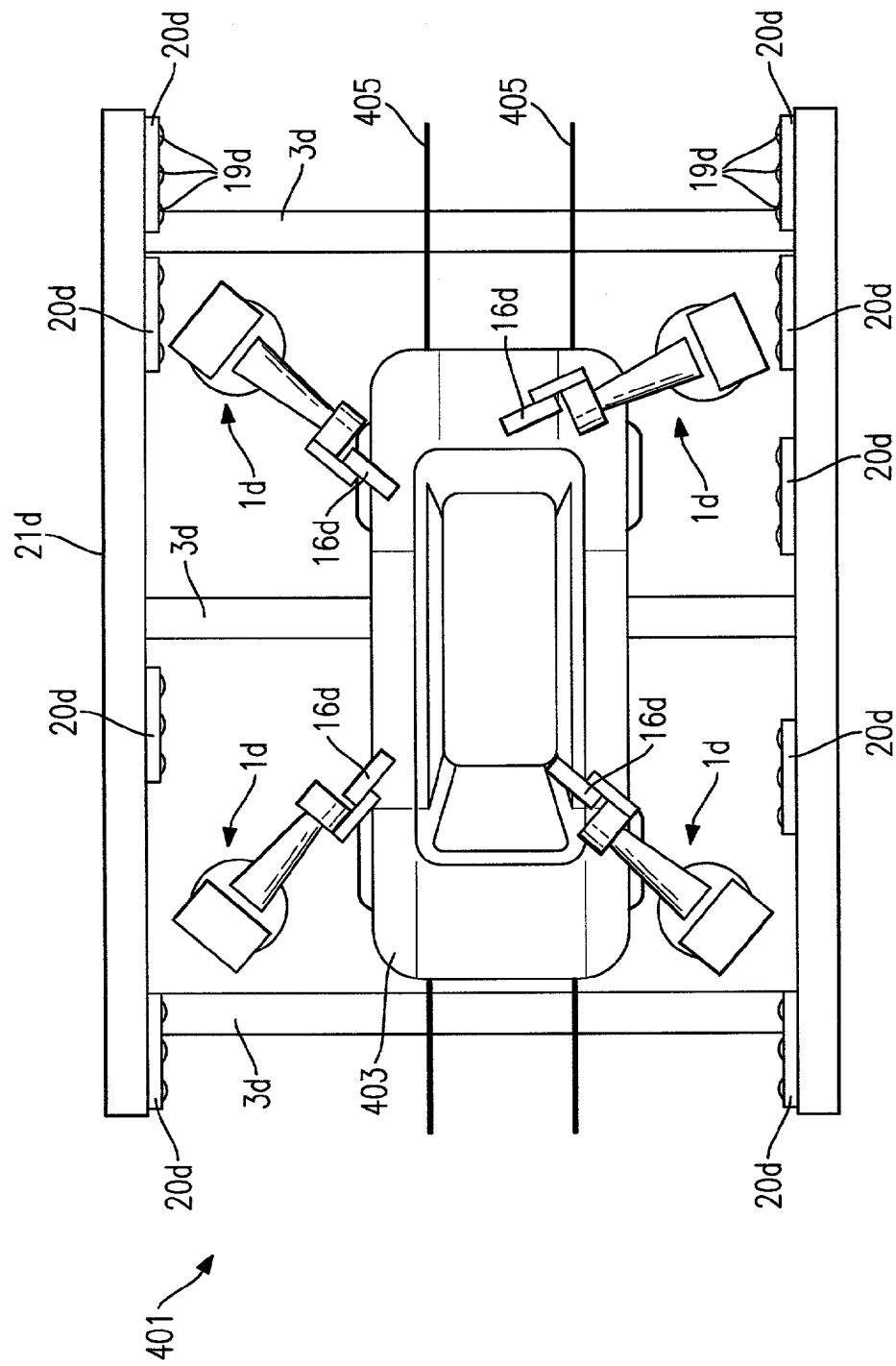

FIG. 15 shows an alternative of the machine tool represented in FIG. 1. Here, an assembly line 401 for the manufacture of an automobile 403 is represented schematically. Components corresponding to each other with regard to their structure and function are designated with the reference numerals of FIGS. 1 to 10, however, with an additional letter. For the explanation reference is made to the entire preceding description.

The workpiece to be processed in this case is the automobile 403 which is moved along the assembly line 401 on a workpiece mounting 3d which also includes tracks 405. For processing the workpiece four machine tools 1d are provided, which carry out processing work at the workpiece 403 with each of their tools 16d. The tools 16d are displaced by the respective machine tool 1d in a comparatively great volume. Each tool 16d comprises three emitter-receiver assemblies which, however, are not shown in FIG. 15. They serve the determination of the position as well as the orientation of the tool 16d with respect to the workpiece mounting 3d. The pertaining measuring system correspondingly includes a plurality of plates 20d fixedly connected with the workpiece mounting 3d via supports 21d. Each of the plates 20d carries three retroreflectors 19d which, as shown in FIG. 1, reflect beams back to the emitter-receiver assemblies mounted on the tools 16d. However, the emitter-receive assembly not only cooperates at each tool 16d with merely one retroreflector group 20d, but for this has a choice among a plurality of such retroreflector groups mounted in predetermined known positions on the mountings 21d. Depending on the current position of the tool 16d in the accessible work volume, it may turn out that a more accurate determination of position and orientation of the tool 16d with respect to the workpiece mounting 3 is possible in that a certain reflector group 20d is selected for the distance determination, which reflector group is favorably arranged with respect to the tool 16d.

Due to the plurality of the reflector assemblies 20d arranged about the machine tool 1d, there is always a reflector assembly 20d in the field of vision of each emitter-receiver assembly, so that a sufficiently accurate distance determination for the corresponding tool 16d is possible.

In the preceding embodiments an emitter-receiver assembly was described for fulfilling the two functions of emitting radiation into the angular range toward the retroreflectors and receiving the radiation reflected back from the retroreflectors. However, it is also possible to provide separate components for each of the functions. It is possible, for example, to modify the embodiment shown in FIG. 3 such that in the center of the plate 31 merely one emitter is provided, and that the components designated with the reference numeral 18, 18' and 18" are receivers for the radiation. It is possible even then to determine the nine distances between the components 18, 18' and 18" on the one hand and the three retroreflectors 19, 19' and 19" on the other hand.

Vice versa, it is also possible, however, that the components designated 18, 18' and 18" in FIG. 3 each are emitters arranged at a fixed distance from each other, and that one single receiver is provided centrally in the plate 31 for determining the nine required distances.

In the embodiment shown in FIGS. 11 and 12 a steel band is used as revolving belt 209. It is also possible, however, to select other materials for the revolving belt. Examples of other materials are plastics and fiber-reinforced plastics, rubber, etc.

Guiding the belt with respect to the belt pulleys is carried out in the embodiment according to FIGS. 11 and 12, as described, by one or several guides reaching around the belt at least partly. It is also possible, however, that the belt has such a cross-sectional profile with projections or recesses or the like which correspond to the recesses and projections in the circumferential surfaces of the pulleys such that they engage and, thus, guiding the belt directly at the circumferential surface of the pulley is possible. An example for this would be the design of the belt as V-ribbed belt having a rib profile, as it is described for example in the Deutsche Industrie Norm (German industrial standard) DIN 7867.

Previously the system and the method, respectively, for determining the position and/or the orientation of two objects relative to each other was described in the application on a machine tool, wherein the two objects are the tool on the one hand and the tool mounting on the other hand and wherein the reflectors are mounted on the tool mounting. However, it is also possible to mount the reflectors on the side of the tool and the emitter or receiver, respectively, on the side of the tool mounting. Further, it is possible to use the system or the method, respectively, on any other pairs of objects where distances or orientations, respectively, are to be determined. In this context, particularly a coordinate measuring device is considered, by means of which the surface of a workpiece is scanned. Here, the workpiece, similar as in the case of the machine tool, can be arranged on a workpiece mounting. A scanning head with a scanning tip for scanning the surface of the workpiece can be supported either by mechanical means, similar to the tool in the machine tool, wherein it is displaced either by a motor or by a user manually along the workpiece surface. However, it is also possible that the scanning head is supported only by the user's hand and is moved by the user freely along the workpiece surface. Then, the emitters and the receivers are either arranged at the scanning head, whereas the retroreflectors are arranged at the workpiece mounting, or retroreflectors are arranged at the scanning head whereas the emitters and receivers are arranged on the workpiece mounting.

The invention claimed is:

1. A system for determining a position of two objects relative to each other, the system comprising:
    a source of coherent radiation;
    a light guiding arrangement for providing a measuring branch for a measuring beam having an optical path length dependent on the position of said two objects relative to each other;
    a radiation intensity sensor for measuring an intensity of an interfering superposition of radiation comprising at least radiation after passing through said measuring branch, and
    a computer configured to determine the position of said two objects relative to each other based on a measuring signal from the radiation intensity sensor;
    said measuring branch comprising:
    at least one emitter fixedly mountable on a first object of the two objects for emitting radiation supplied to said measuring branch into a space between said two objects;

at least three retroreflectors mountable on a second object of said two objects at fixed distances relative to each other; and at least one receiver mountable at said first object for receiving radiation reflected back from said retroreflectors and for supplying the received radiation to the radiation intensity sensor, wherein said emitter is configured to emit the radiation as a divergent beam having an apex angle such that the beam impinges simultaneously on at least three of the at least three retroreflectors.

2. The system according to claim 1, wherein said emitter and said receiver are combined to an emitter-receiver assembly.

3. The system according to claim 2, wherein at least three emitter-receiver assemblies are provided on said first object.

4. The system according to claim 1, wherein said emitter is formed as an emitter assembly and said receiver is formed as a receiver assembly; wherein the emitter and receiver assemblies are separate from each other and mounted on said first object at a fixed distance relative to each other.

5. The system according to claim 4, wherein at least three emitter assemblies and one receiver assembly are provided on said first object.

6. The system according to claim 4, wherein one emitter assembly and at least three receiver assemblies are provided on said first object.

7. The system according to claim 5, further comprising a switch for selectively supplying the radiation to a selectable subset of the at least three emitters.

8. The system according to claim 5, further comprising a radiation interrupter for selectively interrupting the radiation supplied to a selectable emitter.

9. The system according to claim 6, further comprising a radiation interruptor for selectively interrupting the radiation supplied to said radiation intensity sensor from a selected receiver.

10. The system according to claim 1, further comprising a radiation interrupter for selectively interrupting the radiation reflected back from a selectable retroreflector.

11. The system according to claim 1, further comprising a beam splitter for splitting the radiation emitted by said source in a reference beam supplied to a reference branch and the measuring beam supplied to said measuring branch, and wherein the interfering superposition further comprises radiation after passing through said reference branch.

12. The system according to claim 11, wherein said reference branch comprises a device for providing a variable optical path length of said reference beam.

13. The system according to claim 1, further comprising a beam splitter for splitting said measuring beam into a first partial beam and a second partial beam, a device for providing a variable optical path length for said second partial beam, and a device for superimposing said first partial beam and said second partial beam disposed between said source and said emitter.

14. The system according to claim 1, wherein said first object is displaceable relative to said radiation source and wherein the system further comprises a polarization-maintaining fiber for supplying the radiation at least one of from said source to said emitter and from said receiver to said radiation intensity sensor.

15. The system according to claim 14, further comprising a quarter-wave plate in a beam path between the emitter and the receiver.

16. The system according to claim 14, wherein said first object is displaceable relative to said radiation source and wherein a polarization-maintaining fiber is provided, in order to supply the radiation from said source to said emitter or from said receiver to said radiation intensity sensor.

17. The system according to claim 12, wherein the device for providing a variable optical path length comprises:

an endless belt tensioned by at least two rollers arranged at a distance from each other, said belt extending essentially straight in a working range along a common tangent of said two rollers;

a drive for driving said endless belt in a circumferential direction;

at least one first mirror arrangement fixedly mounted on said endless belt and running about said rollers with said belt;

a beam guiding device for directing a light beam substantially parallel with the common tangent; and a second mirror arrangement fixedly arranged relative to said beam guiding device, wherein said first mirror arrangement and said second mirror arrangement are arranged such that, when said second mirror arrangement is disposed on the endless belt within the working range, said light beam emitted from the beam guiding device is at least once reflected back and forth between the first and second mirror arrangements and reenters said beam guiding device.

18. The system according to claim 17, wherein said first mirror arrangement has at least two reflectors disposed at a distance from each other in a direction orthogonal to the common tangent.

19. The device according to claim 18, wherein said first mirror arrangement comprises at least one retroreflector.

20. The system according to claim 19, wherein said retroreflector comprises three flat mirrors which are orthogonal to each other.

21. The system according to claim 18, wherein at least one of said first mirror arrangement and said second mirror arrangement comprises a pair of flat mirrors which are arranged substantially orthogonal to each other and at an angle of substantially 45° relative to said common tangent.

22. The system according to claim 17, wherein at least three first mirror arrangements are mounted on said belt at a distance from each other in a circumferential direction of said belt, and wherein the distance is selected from a range between a first value, which is a product of 0.9 and a distance between axes of said two rollers, and a second value, which is a product of 1.2 and the distance between axes of said two rollers.

23. The system according to claim 22, wherein four first mirror arrangements are mounted on said belt and wherein the distance between the axes of said two rollers has a value equal to a product of a diameter of the two rollers and a number of a range from 1.3 to 1.4.

24. The system according to claim 17, wherein said belt comprises a metal band.

25. The system according to claim 12, wherein the device for providing a variable optical path length comprises:

an endless belt tensioned by at least two rollers arranged at a distance from each other, said belt extending essentially straight in a working range along a common tangent of said two rollers;

a drive for driving said endless belt in its circumferential direction;

at least one first mirror arrangement fixedly mounted on said endless belt and running about said rollers with said belt; and a beam guiding device which directs the light beam substantially parallel to the common tangent, wherein at least three first mirror arrangements are mounted on said belt at a distance from each other in a circumferential direction of said belt, and wherein the distance is selected from a range from a first value, which is the product of 0.9 and a distance between axes of said two rollers, and a second value, which is the product of 1.2 and the distance between the axes of said two rollers.

26. The system according to claim 25, wherein said belt comprises a metal band.

27. The system according to claim 1, wherein at least one of at least three emitter assemblies and at least three receiver assemblies are provided on said first object.

28. The system according to claim 27, wherein said computer is further configured to determine an orientation of said two objects relative to each other.

29. The system according to claim 27, wherein the computer is further configured to detect at least nine distances between retroreflectors and at least one of emitters and receivers; and to non-iteratively calculate the position and the orientation of said two objects relative to each other on the basis of the at least nine distances.

30. The system according to claim 12, wherein the device for providing a variable optical path length comprises:

a first mirror having a first mirror surface having a spiral shape with respect to an axis;

a beam emission and reception unit disposed at a central region of the spiral shape, wherein the beam emission and reception unit is rotatable; and a second mirror which is fixedly positioned with respect to the beam emission and reception unit, wherein the first mirror, the second mirror and the beam emission and reception unit are disposed relative to each other such that, at plural rotational positions of the beam emission and reception unit relative to the first mirror, a light beam emitted from the beam emission and reception unit is incident on the first mirror and reflected therefrom, thereafter incident on the second mirror and reflected therefrom, thereafter incident on the first mirror and reflected therefrom to be received by the beam emission and reception unit.

31. The system according to claim 1, wherein the light guiding arrangement comprises a polarization-maintaining optical fiber having a first end coupled to the source and the detector, and a second end coupled to the emitter and the receiver, and wherein the light guiding arrangement further comprises a phase plate arrangement having an effect of a half-wave plate on the radiation between its entrance into the fiber at the first end and its emission from the fiber at its first end.

32. The system according to claim 1, wherein the source is a white light source.

33. The system according to claim 31, wherein the phase plate arrangement comprises a quarter-wave plate arranged in front of said first end of the polarization-maintaining optical fiber.

34. The system according to claim 31, wherein light entering at said second end of the polarization-maintaining optical fiber is unpolarized light.

35. The system according to claim 30, wherein said second mirror comprises a flat second mirror surface and wherein said spiral shape of said first mirror surface is a shape of a logarithmic spiral.

36. A coordinate measuring machine, comprising:

a workpiece mount;

a scanning measuring head which is displaceable with respect to said workpiece mount to scan a workpiece mountable on said workpiece mount;

a source of coherent radiation;

at least one emitter fixedly mounted on the scanning measuring head for emitting radiation generated by said source;

at least three retroreflectors disposed at predetermined positions relative to said workpiece mount for reflecting the radiation emitted from said at least one emitter;

at least one receiver mounted on said scanning measuring head for receiving radiation reflected from said retroreflectors;

a beam splitter for separating radiation generated by said source to form a measuring radiation and a reference radiation, wherein the measuring radiation is supplied to said at least one emitter; and a radiation sensor for detecting a superposition of radiation received by said receiver and said reference radiation, wherein an optical path length of the reference radiation in a beam path between said beam splitter and said radiation sensor is changeable, and wherein said emitter is configured to emit the radiation as a divergent beam having an apex angle such that the beam impinges simultaneously on at least three of the at least three retroreflectors.

37. The coordinate measuring machine according to claim 36, wherein at least one of at least three emitter assemblies and at least three receiver assemblies are mounted on said scanning measuring head.

38. The coordinate measuring machine according to claim 36, wherein the source is a white light source.

39. The coordinate measuring machine according to claim 36, wherein plural groups of three retroreflectors are disposed at predetermined positions with respect to said workpiece mount, wherein each distance between each pair of said groups is greater than each distance between each pair of retroreflectors with in each of said groups.

40. A machine tool, comprising:

a workpiece mount;

at least one tool which is displaceable with respect to said workpiece mount to machine a workpiece mountable on said workpiece mount;

a source of coherent radiation;

at least one emitter fixedly mounted on the at least one tool for emitting radiation generated by said source;

at least three retroreflectors disposed at predetermined positions relative to said workpiece mount for reflecting the radiation emitted from said at least one emitter;

at least one receiver mounted on said at least one tool for receiving radiation reflected from said retroreflectors;

a beam splitter for separating radiation generated by said source to form a measuring radiation and a reference radiation, wherein the measuring radiation is supplied to said at least one emitter; and a radiation sensor for detecting a superposition of radiation received by said receiver and said reference radiation, wherein an optical path length of the reference radiation in a beam path between said beam splitter and said radiation sensor is changeable, and wherein said emitter is configured to emit the radiation as a divergent beam having an apex angle such that the beam impinges simultaneously on at least three of the at least three retroreflectors.

41. The machine tool according to claim 40, wherein at least one of at least three emitter assemblies and at least three receiver assemblies are mounted on said tool.

42. The machine tool according to claim 40, wherein the source is a white light source.

43. The machine tool according to claim 40, wherein plural groups of three retroreflectors are disposed at predetermined positions with respect to said workpiece mount, wherein each distance between each pair of said groups is greater than each distance between each pair of retroreflectors within each of said groups.

44. The machine tool according to claim 40, having plural tools which are displaceable with respect to said workpiece mount, and wherein at least one emitter is mounted to each tool and wherein at least one receiver is mounted to each tool.

45. A system for determining a position of two objects relative to each other, comprising:
   a source of coherent radiation;
   at least one emitter fixedly mountable on a first object of said two objects for emitting radiation generated by said source;
   at least three retroreflectors mountable on a second object of said two objects at fixed distances relative to each other for reflecting the radiation emitted from said at least one emitter;
   at least one receiver mountable on said first object for receiving radiation reflected from said retroreflectors;
   a beam splitter for separating radiation generated by said source to form a measuring radiation and a reference radiation, wherein the measuring radiation is supplied to said at least one emitter; and
   a radiation sensor for detecting a superposition of radiation received by said receiver and said reference radiation,
   wherein an optical path length of the reference radiation in a beam path between said beam splitter and said radiation sensor is changeable, and
   wherein said emitter is configured to emit the radiation as a divergent beam having an apex angle such that the beam impinges simultaneously on at least three of the at least three retroreflectors.

* * * * *

UNITED STATES PATENT AND TRADEMARK OFFICE
CERTIFICATE OF CORRECTION

PATENT NO. : 7,358,516 B2  Page 1 of 1
APPLICATION NO. : 10/120253
DATED : April 15, 2008
INVENTOR(S) : Frank Hoeller et al.

It is certified that error appears in the above-identified patent and that said Letters Patent is hereby corrected as shown below:

Title Pg, Item (75) Inventors, line 1, "Frank Holler" should be --Frank Hoeller--.

Title Pg, Item (56) on page 2 References Cited, Foreign Patent Documents, line 18, "WO88/07656" is a duplicate and should be deleted.

Column 10, line 38, after the word "angle", the letter "F" should be the symbol -- $\Gamma$ --.

Column 12, lines 57 to 62,

" $d_1 = \vec{F_1}\vec{R_1};\ d_2 = \vec{F_1}\vec{R_2};\ d_3 = \vec{F_1}\vec{R_3}$ "

$d_4 = \vec{F_2}\vec{R_1};\ d_5 = \vec{F_2}\vec{R_2};\ d_6 = \vec{F_2}\vec{R_3}$ $d_7 = \vec{F_3}\vec{R_1};\ d_8 = \vec{F_3}\vec{R_2};\ d_9 = \vec{F_3}\vec{R_3}$ should be $$-- d_1 = \overline{\vec{F_1}\vec{R_1}}\ ;\ d_2 = \overline{\vec{F_1}\vec{R_2}}\ ;\ d_3 = \overline{\vec{F_1}\vec{R_3}}$$
$$d_4 = \overline{\vec{F_2}\vec{R_1}}\ ;\ d_5 = \overline{\vec{F_2}\vec{R_2}}\ ;\ d_6 = \overline{\vec{F_2}\vec{R_3}}$$
$$d_7 = \overline{\vec{F_3}\vec{R_1}}\ ;\ d_8 = \overline{\vec{F_3}\vec{R_2}}\ ;\ d_9 = \overline{\vec{F_3}\vec{R_3}}\ --.$$

Signed and Sealed this

Nineteenth Day of August, 2008

JON W. DUDAS
*Director of the United States Patent and Trademark Office*